United States Patent
Nagamiya et al.

(10) Patent No.: US 10,155,510 B2
(45) Date of Patent: Dec. 18, 2018

(54) CONTROL DEVICE FOR HYBRID VEHICLE

(71) Applicant: TOYOTA JIDOSHA KABUSHIKI KAISHA, Toyota-shi, Aichi (JP)

(72) Inventors: Kiyomi Nagamiya, Nisshin (JP); Yasuhiro Tajima, Nisshin (JP); Haruki Oguri, Toyota (JP); Masafumi Uchihara, Toyota (JP); Shigeki Matsumoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 15/356,254

(22) Filed: Nov. 18, 2016

(65) Prior Publication Data

US 2017/0144650 A1   May 25, 2017

(30) Foreign Application Priority Data

Nov. 19, 2015 (JP) ................. 2015-226394

(51) Int. Cl.
*B60W 20/14* (2016.01)
*B60W 20/12* (2016.01)
(Continued)

(52) U.S. Cl.
CPC ............... *B60W 20/14* (2016.01); *B60K 6/22* (2013.01); *B60K 6/445* (2013.01); *B60W 20/12* (2016.01); *B60W 20/13* (2016.01); *B60W 50/0097* (2013.01); *B60K 6/46* (2013.01); *B60W 10/06* (2013.01); *B60W 10/08* (2013.01); *B60W 20/00* (2013.01); *B60W 30/18127* (2013.01); *B60W 2550/142* (2013.01); *B60W 2550/20* (2013.01); *B60W 2550/402* (2013.01); *B60W 2710/06* (2013.01); *B60W 2710/08* (2013.01); *B60W 2710/244* (2013.01); *B60Y 2200/92* (2013.01); *B60Y 2300/181* (2013.01);
(Continued)

(58) Field of Classification Search
None
See application file for complete search history.

(56) References Cited

U.S. PATENT DOCUMENTS

| 6,131,680 | A | 10/2000 | Nii et al. |
| 2010/0241297 | A1 | 9/2010 | Aoki et al. |
| 2015/0019057 | A1* | 1/2015 | Morisaki .................. B60L 7/18 |
| | | | 701/22 |

FOREIGN PATENT DOCUMENTS

| JP | H09-308012 A | 11/1997 |
| JP | 2000-333305 A | 11/2000 |

(Continued)

*Primary Examiner* — Todd M Melton
*Assistant Examiner* — Jason R Roberson
(74) *Attorney, Agent, or Firm* — Oliff PLC

(57) ABSTRACT

When it is judged that a downward slope segment exists in a scheduled traveling route, the control device of a hybrid vehicle sets a target remaining capacity SOC* in a pre-use segment in a downward slope segment and the downward slope segment to a "low-side remaining capacity Sd which is $\Delta Sd$ smaller than a standard remaining capacity Sn." Furthermore, when it is presumed that a rise amount of a remaining capacity by an extended regeneration control is large in the pre-use segment and the downward slope segment, the target remaining capacity SOC* is set to a "low-side remaining capacity Sd which is a sum of $\Delta Sd$ and $\Delta S1$ smaller than the standard remaining capacity Sn."

4 Claims, 16 Drawing Sheets

(51) Int. Cl.
  *B60K 6/22*     (2007.10)
  *B60K 6/445*    (2007.10)
  *B60W 50/00*    (2006.01)
  *B60W 20/13*    (2016.01)
  *B60K 6/46*     (2007.10)
  *B60W 10/06*    (2006.01)
  *B60W 10/08*    (2006.01)
  *B60W 20/00*    (2016.01)
  *B60W 30/18*    (2012.01)

(52) U.S. Cl.
  CPC . *B60Y 2300/18125* (2013.01); *B60Y 2300/43* (2013.01); *B60Y 2300/60* (2013.01); *B60Y 2300/91* (2013.01); *Y02T 10/6239* (2013.01); *Y02T 10/6291* (2013.01); *Y02T 10/7258* (2013.01); *Y10S 903/93* (2013.01)

(56) References Cited

FOREIGN PATENT DOCUMENTS

| | | | |
|---|---|---|---|
| JP | 2004246455 A | 9/2004 | |
| JP | 2005-160269 A | 6/2005 | |
| JP | 2008-279803 A | 11/2008 | |
| JP | 2009-090735 A | 4/2009 | |
| JP | 2009-126450 A | 6/2009 | |
| JP | 2011-183962 A | 9/2011 | |
| JP | 2013-002850 A | 1/2013 | |
| JP | 2014-110677 A | 6/2014 | |
| JP | 2015-019521 A | 1/2015 | |
| JP | 2015019521 | * 1/2015 | ............ B60L 11/126 |

* cited by examiner

CONTROL DEVICE FOR HYBRID VEHICLE

BACKGROUND OF THE INVENTION

Field of the Invention

The present invention relates to a control device for a hybrid vehicle which controls a hybrid vehicle comprising both an internal combustion engine and a motor as driving sources of the vehicle.

Description of the Related Art

A hybrid vehicle (which may be simply referred to as a "vehicle" hereafter) comprising both an internal combustion engine (which may be simply referred to as an "engine" hereafter) and a motor as driving sources of the vehicle is known. The vehicle comprises a storage battery, and the storage battery supplies electric power to the motor, while it is charged with output power of the engine.

In addition, when rotation of an axle is transmitted to the motor, a generator generates electric power (namely, the motor generates electricity), and the storage battery is charged also by the electric power. That is, kinetic energy of the vehicle is converted into electrical energy, and the electrical energy is collected by the storage battery. This conversion of energy may be referred to as "regeneration." When the regeneration is performed, braking force of the vehicle which the motor generates (namely, torque which decelerates vehicle speed) may be referred to as "regenerative braking force", and braking of the vehicle using the regenerative braking force may be referred to as "regenerative braking." Electric power collected in the storage battery by the regenerative braking may be referred to as "regenerative electric power." When energy is collected in the storage battery by performing the regenerative braking at the time of deceleration of the vehicle, fuel consumption (specific fuel consumption) of the vehicle can be improved.

On the other hand, a remaining capacity SOC (State of Charge; which will be simply referred to as an "SOC" hereafter) of the storage battery changes during a running of the vehicle. When increase and decrease of the remaining capacity SOC are repeated when the remaining capacity SOC is in either one of a state where the remaining capacity SOC is high and a state where the remaining capacity SOC is low, deterioration of the storage battery is promoted. Therefore, during a running of the vehicle, a control device for a vehicle sets a target remaining capacity to a suitable value between a remaining capacity upper limit and a remaining capacity lower limit, and controls the engine and the motor so that the remaining capacity SOC approaches the target remaining capacity.

By the way, when a vehicle runs a downward slope, generally, a driver takes a foot off an accelerator pedal and further steps on a brake pedal in some cases (according to circumstances). At this time, a control device for the vehicle suppresses increase of vehicle speed using regenerative braking force and, thereby, raises a remaining capacity SOC.

When the remaining capacity SOC increases (i.e., when an electric power amount charged in a storage battery increases), a distance for which the vehicle can run only with output power of a motor with an operation of an engine stopped becomes longer. Therefore, if the remaining capacity SOC can be increased as much as possible in a range which is less than a remaining capacity upper limit when the vehicle runs a downward slope, fuel consumption of the vehicle can be raised further.

However, since the remaining capacity SOC reaches a remaining capacity upper limit soon when a downward slope is long, it becomes impossible to increase the remaining capacity SOC increase further. Therefore, the larger difference between the remaining capacity SOC and the remaining capacity upper limit at a starting point of the downward slope is, the larger fuel consumption improvement effect obtained by running a downward slope becomes.

Then, when a downward slope segment which has a predetermined difference of elevation exists on a scheduled traveling route, one of conventional control devices for a hybrid vehicle (which may be referred to as a "conventional device" hereafter) gives priority to a running in which an operation of an engine is stopped and only a motor is operated over a running in which both an engine and a motor are operated so that a remaining capacity SOC approaches a remaining capacity lower limit as much as possible before a vehicle goes into the downward slope segment (refer to the Patent Document 1 (PTL1)). Hereinafter, a running in which an operation of an engine is stopped and only a motor is operated may be referred to as an "EV running", and a running in which both an engine and a motor are operated may be referred to as an "HV running."

In accordance with this conventional device, since the remaining capacity SOC is made lower than that at normal time during a period when the vehicle is running a segment before the vehicle arrives at a starting point of the downward slope segment (which may be referred to as a "pre-use segment" hereafter), use frequency of the engine during the period falls. Furthermore, since the difference between the remaining capacity SOC and the remaining capacity upper limit becomes larger at the starting point of the downward slope segment, more electric power can be collected during the running of the downward slope segment. Therefore, the use frequency of the engine thereafter also falls. As a result, the fuel consumption of the hybrid vehicle can be improved.

On the other hand, a technology referred to as an "extended regeneration control" is also known in the art. When it is predicted that a vehicle slows down based on the information about a driver's operation tendency (for example, deceleration action, etc.) and a location of a vehicle, etc., a control device which performs the extended regeneration control sets a point where it is predicted that the deceleration of the value will be ended as a target deceleration ending point. Furthermore, the present control device increases a regenerated electric power amount by setting a suitable deceleration starting point and increasing regenerative braking force from the deceleration starting point, so that the regenerated electric power amount becomes larger during a deceleration running to this target deceleration ending point (in other words, so that an amount of consumption of energy by braking using a friction braking device resulting from performing a rapid deceleration becomes smaller) (refer to the Patent Document 2 (PTL2)).

Thus, since the extended regeneration control can raise the remaining capacity SOC further, a distance for which the EV running is possible becomes longer. Therefore, the fuel consumption of a hybrid vehicle can be further improved by adopting the extended regeneration control.

CITATION LIST

Patent Literature

[PTL1] Japanese Patent Application Laid-Open "kokai" No. 2005-160269
[PTL2] Japanese Patent Application Laid-Open "kokai" No. 2014-110677

SUMMARY OF THE INVENTION

By the way, when a vehicle runs a congested segment, the vehicle runs at low speed, or repeats a low-speed running and a stopping. Therefore, when a vehicle runs a congested segment, a regenerated electric power amount is small since frequency of the EV running rises and frequency of deceleration from a low-speed running rises, there is little. As a result, the remaining capacity SOC falls.

Therefore, since the remaining capacity SOC reaches the remaining capacity lower limit when the congested segment is long, it becomes impossible to continue the EV running any more, and it ends up having to switch to the HV running. Furthermore, a "compulsory charging", in which an engine is operated for the purpose of raising the remaining capacity SOC and a storage battery is compulsorily charged with output power of the engine, may be performed. When the operation opportunity of an engine increases thus, fuel consumption of a vehicle gets worse. Therefore, the smaller the difference between the remaining capacity SOC and the remaining capacity lower limit at a starting point of a congested segment becomes.

From such a viewpoint, a control, in which the remaining capacity SOC at a starting point of a congested segment is raised by setting a target remaining capacity of the remaining capacity SOC higher than that at normal time until a vehicle arrives at the congested segment when the congested segment is expected to exist on a scheduled traveling route, has been considered. Such control may be referred to as "congestion control." Furthermore, the congestion control and the above-mentioned downward slope control may be collectively referred to as "look-ahead assistance control."

However, when the downward slope control, as the look-ahead assistance control, and the extended regeneration control are used together, the extended regeneration control may be performed in a period when a vehicle is running the above-mentioned pre-use segment and downward slope segment, for example. In this case, even though the target remaining capacity is set to a value lower than that at normal time in the pre-use segment, a case where the remaining capacity SOC at a starting point of the downward slope segment has not yet been sufficiently reduced by the extended regeneration control may occur. Furthermore, a case where the remaining capacity SOC increases beyond expectation by the extended regeneration control in a downward slope segment may occur. As a result, a situation where the remaining capacity SOC reaches the remaining capacity upper limit and therefore cannot be increased any more, and electric power that should have been able to be collected in a storage battery during a running on a downward slope segment cannot be collected may occur.

Furthermore, when the congestion control, as the look-ahead assistance control, and the extended regeneration control are used together, a case where the extended regeneration control is performed in a status where the remaining capacity SOC is high since the target remaining capacity is set to a large value by the congestion control and, thereby, the remaining capacity SOC increases further and reaches the remaining capacity upper limit may occur, for example. Also in this case, since the remaining capacity SOC cannot be increased any more, electric power that should have been able to be collected in a storage battery cannot be collected.

As can be understood from the above explanation, when the look-ahead assistance control and the extended regeneration control are used together, there is a possibility that electric power that should have been able to be collected cannot be collected.

Then, one of objectives of the present invention is to provide a control device for a hybrid vehicle which can improve fuel consumption by collecting more regenerative electric power in a "control device for a hybrid vehicle" which comprises a control part configured to be able to perform the look-ahead assistance control (at least one of the downward slope control and the congestion control) and the extended regeneration control.

A control device for a hybrid vehicle according to the present invention (which may be referred to as a "present invention device" hereafter) for attaining the above-mentioned objective is applied to a hybrid vehicle (10) comprising an internal combustion engine (23) as a driving source of a vehicle and motors (21, 22) as driving sources, and a storage battery (31) that supplies electric power to said motors, configured to be able to perform a regenerative braking using said motors and charge said storage battery with electric power generated by the regenerative braking, and configured to be able to charge said storage battery with electric power generated by using output power of said internal combustion engine.

In addition, the present invention device comprises a control part (40) configured to control said internal combustion engine and motors so that demand driving force required for said vehicle is fulfilled, and so that the remaining capacity of said storage battery approaches target remaining capacity (SOC*) set to a standard remaining capacity (Sn).

Furthermore, said control part comprises:

an information-acquisition means configured to acquire information about a scheduled traveling route of said vehicle and a location of said vehicle (40, 61, 63, step S101, step S111), an assistance control means (40) configured to perform, as a look-ahead assistance control, at least one control of a downward slope control (routine of FIG. 10 or FIG. 14) and a congestion control (routine of FIG. 11 or FIG. 15), and an extended regeneration control means configured to perform an extended regeneration control (routine of FIG. 12, 40).

Said downward slope control is a control in which said target remaining capacity is changed to a low-side remaining capacity (Sd) smaller than said standard remaining capacity (Sn) during said vehicle is running a segment including at least a pre-use segment within a first segment when it is judged that "a scheduled traveling route of said vehicle contains a downward slope segment that fulfills a predetermined downward slope segment condition" based on information about said scheduled traveling route. Said pre-use segment is a segment from "a starting point of said downward slope control" to "a starting point of said downward slope segment." Said first segment is a segment from "said starting point of said downward slope control" to "an ending point of said downward slope segment". Said starting point of said downward slope control is "a point a predetermined first distance in front of said starting point of said downward slope segment."

Said congestion control is a control in which said target remaining capacity is changed to a high-side remaining capacity (Sh) larger than said standard remaining capacity (Sn) during said vehicle is running a second segment when it is judged that said scheduled traveling route of said vehicle contains a congested segment that fulfills a predetermined congested segment condition based on information about said scheduled traveling route. Said second segment is a segment from "a starting point of said congestion control" to "a starting point of said congested segment." Said starting point of said congestion control is a point a predetermined second distance in front of said starting point of said congested segment.

Said extended regeneration control is a control in which a location where said slowdown of said vehicle is predicted to end is set as a target slowdown ending location and said vehicle is decelerated by said regenerative braking so that an electric power amount charged in said storage battery by said regenerative braking when said vehicle with said target slowdown ending location set slows down becomes larger as compared with that when said vehicle with said target slowdown ending location not set slows down, when it is predicted based on information about a location of said vehicle that said vehicle slows down.

As mentioned above, when the congestion control, as the look-ahead assistance control, and the extended regeneration control are used together, a case where the extended regeneration control is performed in a period when a vehicle is running the pre-use segment and the downward slope segment and, as a result, the remaining capacity SOC reaches the remaining capacity upper limit may occur.

Furthermore, when the congestion control, as the look-ahead assistance control, and the extended regeneration control are used together, a case where the extended regeneration control is performed when the target remaining capacity is set to a large value by the congestion control and, as a result, the remaining capacity SOC further reaches the remaining capacity upper limit may occur.

Then, said control part comprises a target remaining capacity correction means (40) configured to;

correct said target remaining capacity to a value that is a first adjustment amount (ΔS1, ΔS1a) smaller than said low-side remaining capacity (step S104 to step S106 of FIG. 10 and step S142 to step S144 and step S105 of FIG. 14) in a first case where it is presumed that an electric power amount charged in said storage battery by said extended regeneration control when said assistance control means is configured to perform said downward slope control as said look-ahead assistance control and said vehicle runs said first segment is larger than a first threshold electric power amount (judgment as "Yes" in step S104 of FIG. 10 and judgment as "Yes" in step S142 of FIG. 14), and correct said target remaining capacity to a value that is a second adjustment amount (ΔS2, ΔS2a) smaller than said high-side remaining capacity (step S114 to step S116 of FIG. 11 and step S152 to step S154 and step S115 of FIG. 15) in a second case where it is presumed that an electric power amount charged in said storage battery by said extended regeneration control when said assistance control means is configured to perform said congestion control as said look-ahead assistance control and said vehicle runs said second segment is larger than a second threshold electric power amount (judgment as "Yes" in step S114 of FIG. 11 and judgment as "Yes" in step S152 of FIG. 15).

In accordance with the above-mentioned target remaining capacity correction means, said target remaining capacity is corrected to a "value that is a first adjustment amount smaller than said low-side remaining capacity" in said first case, when said assistance control means is configured to perform said downward slope control as said look-ahead assistance control. Therefore, since the target remaining capacity is corrected to a value smaller than a usual low-side remaining capacity in the pre-use segment even in a case where the downward slope control and the extended regeneration control are used together, a possibility that the remaining capacity SOC may reach the remaining capacity upper limit falls even when the extended regeneration control is performed in a period when the vehicle is running the pre-use segment and/or the downward slope segment. Therefore, since a possibility that a situation where electric power that should have been able to be collected in the storage battery during the vehicle is running the downward slope segment cannot be collected may occur falls, fuel consumption of the vehicle can be improved further.

Furthermore, in accordance with the above-mentioned target remaining capacity correction means, said target remaining capacity is corrected to a "value that is a second adjustment amount smaller than said high-side remaining capacity" in said second case, when said assistance control means is configured to perform said congestion control as said look-ahead assistance control. Therefore, since the target remaining capacity in a segment before arriving at the congested segment is corrected to a value smaller than a usual high-side remaining capacity even in a case where the congestion control and the extended regeneration control are used together, a possibility that the remaining capacity SOC may reach the remaining capacity upper limit falls even when the extended regeneration control is performed in a period when the vehicle is running the segment before arriving at the congested segment. Therefore, since a possibility that a situation where electric power that should have been able to be collected in the storage battery during the vehicle is running the segment before arriving at the congested segment cannot be collected may occur falls, fuel consumption of the vehicle can be improved further.

In one aspect of the present invention device, said target remaining capacity correction means is configured so that;

the larger a first index value that has a correlation with an electric power amount charged in said storage battery by execution of said extended regeneration control in a period when said vehicle is running said first segment in said first case, the larger value said first adjustment amount is changed to, and the larger a second index value that has a correlation with an electric power amount charged in said storage battery by execution of said extended regeneration control in a period when said vehicle is running said second segment in said second case, the larger value said second adjustment amount is changed to.

In accordance with this aspect, since the target remaining capacity can be set according to an electric power amount predicted to be charged in the storage battery by execution of the extended regeneration control, a possibility that the remaining capacity SOC may reach the remaining capacity upper limit falls further. Therefore, since a possibility that a situation where electric power that should have been able to be collected in the storage battery cannot be collected may occur falls, fuel consumption of the vehicle can be improved furthermore.

In the above-mentioned explanation, in order to help understanding of the present invention, names and/or signs used in embodiments which will be mentioned later are attached in parenthesis to constituent elements of inventions corresponding to the embodiments. However, constituent elements of the present invention are not limited to the embodiments specified with the above-mentioned signs. Other objectives, other features and accompanying advantages of the present invention will be easily understood from the following explanation about the embodiments of the present invention described referring to drawings.

DESCRIPTION OF THE PREFERRED EMBODIMENTS (Configuration)

Figure 1:
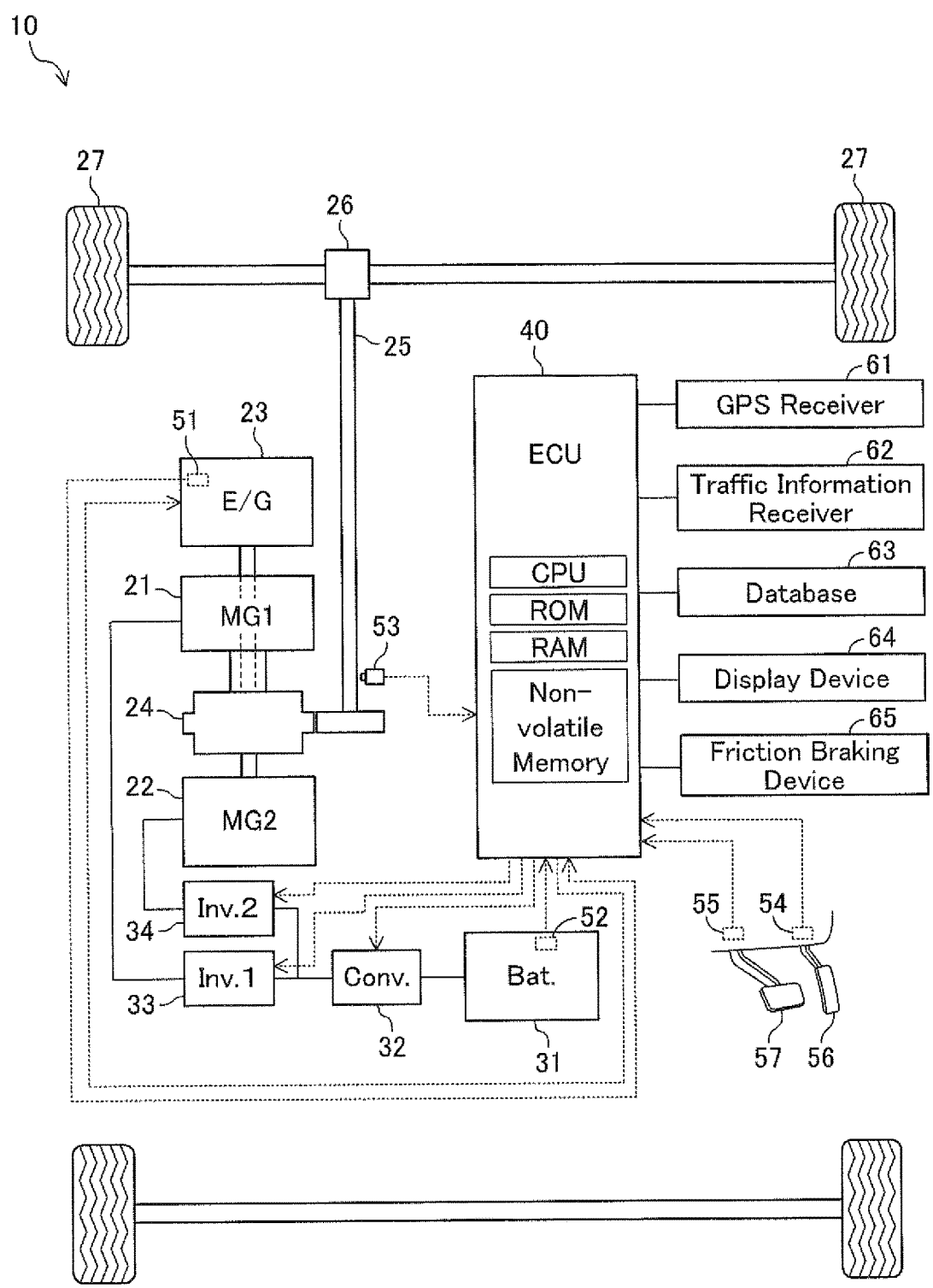
FIG. 1 is a schematic diagram of a vehicle to which a control device for a hybrid vehicle (the present control device) according to an embodiment of the present invention is applied.

Hereafter, a control device for a hybrid vehicle (which may be referred to as a "present control device" hereafter) according to an embodiment of the present invention will be explained referring to drawings. As shown in FIG. 1, a hybrid vehicle 10 to which the present control device is applied mounts a first motor 21, a second motor 22 and an internal combustion engine 23.

The vehicle 10 further mounts a power splitting mechanism 24, a storage battery 31, a boost converter 32, a first inverter 33, a second inverter 34 and an ECU 40. The ECU 40 corresponds to the present control device.

The first motor 21 and the second motor 22 are three-phase synchronous generator-motors which can function as any of a generator and a motor, respectively.

The first motor 21 is used mainly as a generator. Further, the first motor 21 performs clanking of the engine 23, when the engine 23 starts up. The second motor 22 is used mainly as a motor, and can generate driving force for the vehicle 10 (torque for making the vehicle run). The engine 23 can also generate driving force for the vehicle 10. The engine 23 is a 4-cylinder four-stroke-cycle gasoline engine.

The power splitting mechanism 24 is a well-known planetary gear mechanism. The power splitting mechanism 24 comprises a ring gear, a plurality of power splitting planetary gears, a plurality of reduction planetary gears, a first sun gear, a second sun gear, a first pinion carrier and a second pinion carrier (all are not shown).

The power splitting planetary gear and the reduction planetary gear are engaged with a ring gear, respectively. The first sun gear is engaged with the power splitting planetary gear. The second sun gear is engaged with the reduction planetary gear. The first planetary carrier holds a plurality of the power splitting planetary gears in a state where they can revolve on their own axes and revolve around the sun gear. The second planetary carrier holds a plurality of the reduction planetary gears in a state where they can revolve on their own axes.

The ring gear is connected with the axle 25 through a counter gear disposed on a periphery of the ring gear so that torque can be transmitted between them. An output axis of the engine 23 is connected with the first planetary carrier so that torque can be transmitted between them. An output axis of the first motor 21 is connected with the first sun gear so that torque can be transmitted between them. An output axis of the second motor 22 is connected with the second sun gear so that torque can be transmitted between them.

Figure 2:
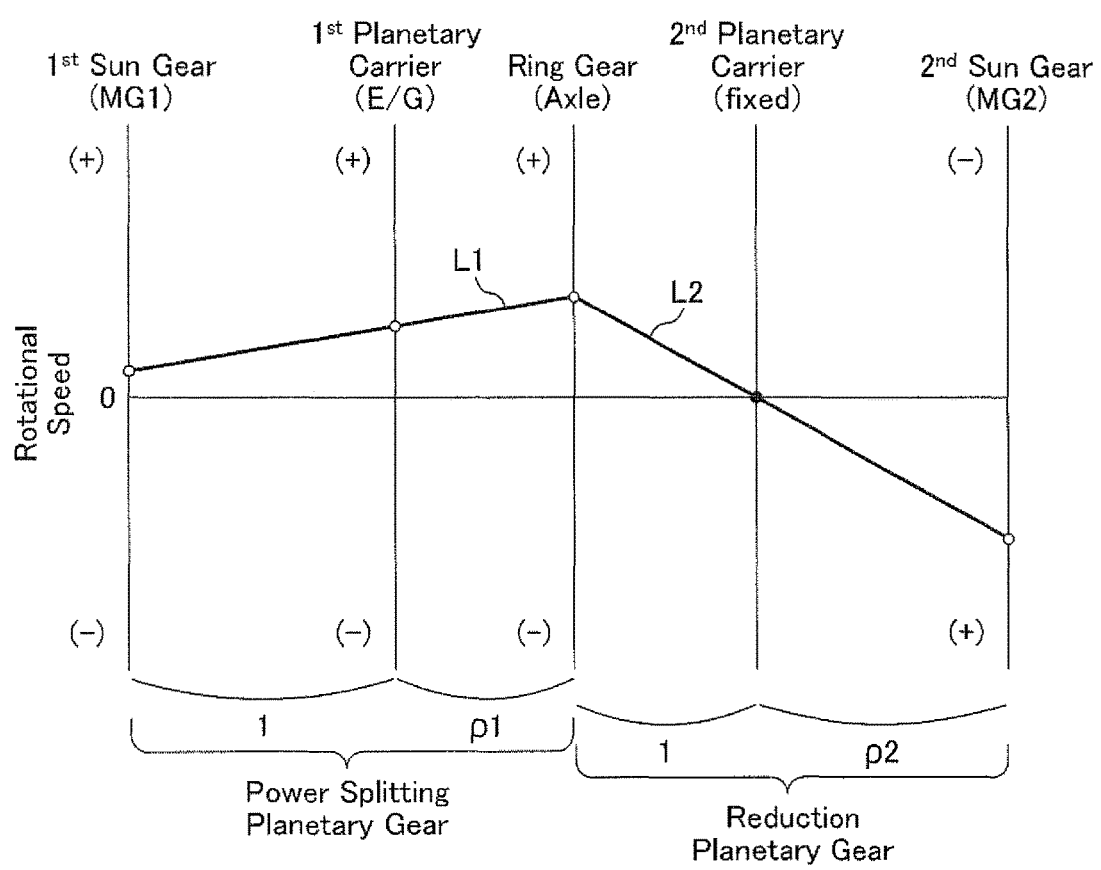
FIG. 2 is an alignment chart for showing a relation of rotational speed among a first motor, a second motor, an engine and a ring gear.

A relation among rotational speed (MG1 rotational speed) Nm1 of the first motor 21, engine rotational speed NE of the engine 23 and ring gear rotational speed Nr of the power splitting mechanism 24, and rotational speed (MG2 rotational speed) Nm2 of the second motor 22 and the ring gear rotational speed Nr is expressed by a well-known alignment chart which is shown in FIG. 2. Two lines shown in the alignment chart may be referred to as an operational common line L1 and an operational common line L2.

In accordance with the operational common line L1, a relation among the MG1 rotational speed Nm1, the engine rotational speed NE and the ring gear rotational speed Nr can be expressed by the following formula (1). Here, a gear ratio ρ1 is a ratio of a teeth number of the first sun gear to a teeth number of the ring gear (namely, ρ1=the teeth number of the first sun gear/the teeth number of the ring gear).

$$Nm1=Nr-(Nr-NE)\times(1+\rho1)/\rho1 \qquad (1)$$

On the other hand, in accordance with the operational common line L2, a relation between the MG2 rotational speed Nm2 and the ring gear rotational speed Nr can be expressed by the following formula (2). Here, a gear ratio ρ2 is a ratio of a teeth number of the second sun gear to a teeth number of the ring gear (namely, ρ2=the teeth number of the second sun gear/the teeth number of the ring gear).

$$Nm2=Nr\times(1+\rho2)/\rho2-Nr \qquad (2)$$

Referring to FIG. 1 again, the axle 25 is connected with driving wheels 27 through a differential gear 26 so that torque can be transmitted between them.

The storage battery 31 is a secondary battery (in this example, a lithium ion storage battery) which can be charged and discharged. Direct-current (DC) electric power outputted by the storage battery 31 is voltage-converted (boosted) into high-voltage electric power by the boost converter 32. The first inverter 33 converts the high-voltage electric power into alternating-current (AC) electric power, and supplies it to the first motor 21. Similarly, the second inverter 34 converts the high-voltage electric power into AC electric power, and supplies it to the second motor 22.

On the other hand, when the first motor 21 operates as a generator, the first inverter 33 converts generated AC electric power into DC electric power, and supplies it to the boost converter 32 and/or the second inverter 34. Similarly, when the second motor 22 operates as a generator, the second inverter 34 converts generated AC electric power into DC electric power, and supplies it to the boost converter 32 and/or the first inverter 33. The boost converter 32 steps down (buck) the DC electric power supplied from the first inverter 33 and/or the second inverter 34, and supplies it to the storage battery 31. As a result, the storage battery 31 is charged.

The ECU 40 is an electronic control circuit which has a microcomputer including a CPU (Central Processing Unit), ROM (Read-Only Memory), RAM (Random-Access Memory), a nonvolatile memory, and an interface, etc., as a main component. The ECU is an abbreviation for an electric control unit. The CPU realizes various functions which will be mentioned later by performing instructions (routines) stored in the memory (ROM). The ECU 40 is connected with the engine 23, the boost converter 32, the first inverter 33, and the second inverter 34, and controls these. The ECU 40 may be divided into a plurality of ECUs according to functions. In that case, the plurality of ECUs is configured to be able to exchange data (communicate) with one another through communication and sensor system CAN (Controller Area Network).

The ECU 40 is connected with a crank angle sensor 51, an ampere meter (ammeter) 52, a vehicle speed sensor 53, an accelerator opening sensor 54, and a brake opening sensor 55.

The crank angle sensor 51 measures the rotational position of the crankshaft of Engine 23, and outputs the signal showing the degree CA of crank angle. ECU 40 computes the Engine rotational speed NE of Engine 23 based on the degree CA of crank angle. The ampere meter 52 outputs the signal showing the electric current IB which flows through the storage battery 31. ECU 40 computes remaining capacity SOC which is the electric power amount charged in the storage battery based on the electric current IB.

The vehicle speed sensor 53 detects a rotational speed of the axle 25, and outputs a signal representing a running speed (vehicle speed) Vs of the vehicle 10. The accelerator opening sensor 54 outputs a signal representing an operation amount (accelerator operation amount) Ap of the accelerator pedal 56. The brake opening sensor 55 outputs a signal representing an operation amount (brake operation amount) Bp of the brake pedal 57.

Furthermore, the ECU 40 is connected with a GPS receiver 61, a traffic information receiver 62, a data base 63, a display device 64 and a friction braking device 65.

The GPS receiver 61 acquires a current position (location) Pn of the vehicle 10 based on a signal from a GPS (Global Positioning System) satellite, and transmits a signal representing the current position Pn to the ECU 40.

The traffic information receiver 62 receives road information including congestion information and speed restrictions information, etc. around the current position Pn, which a road and traffic information communication system (VICS (registered trademark): Vehicle Information and Communication System, not shown in drawings) offers through a radio wave beacon and an FM multiplex broadcast, etc.

The data base 63 comprises a hard disc (HDD) which has memorized map data (map information). The map data includes information about a "node" such as a point of intersection and a dead end, etc., a "link" which connects the nodes to each other and a "facility" along the link, such as a building and a parking lot, etc. Furthermore, the map data includes a length of a segment of a road corresponding to each link, position coordinates of a node at one end (starting point) and another node at the other end (ending point) of a link, and an average gradient of a road corresponding to a link. The average gradient is a ratio of a "difference of elevation between both ends of a road corresponding to a link" to a "distance between positions of both ends of a road corresponding to a link (namely, distance between positions of both nodes)."

The display device 64 is disposed in a center console (not shown) prepared in a vehicle interior of the vehicle 10. The display device 64 comprises a display, and can display a map based on map data and the current position Pn of the vehicle 10, etc. on the display.

The display of the display device 64 operates also as a touch panel which receives an operational input. Furthermore, the display device 64 comprises a pronunciation device (not shown). The display device 64 can perform a reproducing of beep sound and an announcement, etc. according to an instruction from the ECU 40.

When a driver of the vehicle 10 inputs a destination using the display device 64, the ECU 40 searches for a path (scheduled traveling route) from the current position Pn to the destination based on a map database. The scheduled traveling route is constituted by set of nodes. The ECU 40 can perform guidance according to the scheduled traveling route to a driver with indication on the display device 64 and voice produced from the pronunciation device.

The friction braking device 65 comprises a master cylinder which pressurizes hydraulic oil by tread force of the brake pedal 57, a brake apparatus including a well-known wheel cylinder prepared in each wheel, and a brake actuator. The brake actuator gives frictional force to a brake disc by adjusting oil pressure supplied to the wheel cylinder. Therefore, the ECU 40 can adjust friction braking force generated at each wheel by driving the brake actuator.

(Operation)

Next, an operation of the present control device (ECU 40) will be explained. The present control device is a device which solves a problem that occurs when the "downward slope control and/or congestion control" and the "extended regeneration control" are used together, which will be mentioned later. First, control which is a precondition for these controls will be explained, and then these controls will be explained. In the present specification, the "downward slope control and congestion control" may be referred to as a "look-ahead assistance control" or simply an "assistance control."

1. Driving Force Control by ECU

The hybrid vehicle 10 controls the first motor 21, the second motor 22 and the engine 23 in association with one another. Fundamental content of this control is well-known and described in Japanese Patent Application Laid-Open "kokai" No. 2009-126450 (United States Unexamined Patent Application Publication No. US2010/0241297) and Japanese Patent Application Laid-Open "kokai" No. H09-308012 (U.S. Pat. No. 6,131,680 filed on Mar. 10, 1997), etc., for example.

Briefly, the ECU 40 determines ring gear demand torque Tr*, which is a target value of torque (ring gear generation torque) Tr that acts on a ring gear, based on the accelerator operation amount Ap and the vehicle speed Vs. Since the ring gear generation torque Tr bears a proportionate relationship to torque which acts on the driving wheels 27, the larger the torque which acts on the driving wheels 27 becomes, the larger the ring gear generation torque Tr becomes. Therefore, the ring gear demand torque Tr* is also a demand driving force required for the vehicle 10.

The ECU 40 controls the engine 23, the boost converter 32, the first inverter 33 and the second inverter 34 so that the ring gear generation torque Tr becomes equal to the ring gear demand torque Tr* and the remaining capacity SOC becomes identical (close) to the target remaining capacity SOC*.

For example, when the remaining capacity SOC is approximately identical to the target remaining capacity SOC*, in an operating range where the operating efficiency of the engine 23 is high, the ECU 40 makes both the engine 23 and the second motor 22 generate output power, and the first motor 21 generates electric power with a part of engine output power Pe generated by the engine 23. In this case, the electric power generated by the first motor 21 is supplied to the second motor 22.

When the remaining capacity SOC is lower than the target remaining capacity SOC*, the ECU 40 raises the engine output power Pe to raise a generation amount of electric power by the first motor 21. Thereby, the remaining capacity SOC increases and approaches the target remaining capacity SOC*.

On the other hand, the ECU 40 stops an operation of the engine 23 and makes only the second motor 22 generate output power in an operating range where the operating efficiency of the engine 23 is low, such as when the vehicle 10 starts moving and when the vehicle 10 is running at a low load, etc. In this case, the remaining capacity SOC falls.

By the way, in order to prevent deterioration of the storage battery 31 from progressing early, it is desirable to maintain the remaining capacity SOC "between a remaining capacity lower limit Smin and a remaining capacity upper limit Smax." Therefore, when the remaining capacity SOC becomes lower than the remaining capacity lower limit Smin, the ECU 40 operates the engine 23 and makes the first motor 21 generate electric power with the output power of the engine 23 to carry out a "compulsory charging" of the storage battery 31. Thereby, the remaining capacity SOC becomes larger than the remaining capacity lower limit Smin.

Furthermore, when the remaining capacity SOC becomes higher than the remaining capacity upper limit Smax, the ECU 40 stops the operation of the engine 23 even in an operating range where the operating efficiency of the engine 23 is high, except for a case where high output power and high torque are required, and makes only the second motor 22 generate output power. Thereby, the remaining capacity SOC becomes smaller than the remaining capacity upper limit Smax.

2. Braking Force Control by ECU

When a driver requires braking force in order to decelerate the vehicle 10, the driver performs an operation to set both the accelerator operation amount Ap and the brake operation amount Bp to "0", or an operation to set the accelerator operation amount Ap to "0" and to increase the brake operation amount Bp. When a braking force is required, the ECU 40 determines target braking force based on the accelerator operation amount Ap, the brake operation amount Bp and the vehicle speed Vs, and generates "regenerative braking force and friction braking force" so that actual braking force becomes identical (close) to the target braking force. At this time, when regenerative braking force is insufficient for the target braking force, the shortfall is compensated with braking force.

When the ECU 40 generates regenerative braking force, the ECU 40 makes the first motor 21 and/or the second motor 22 generate electric power. In other words, the ECU 40 converts kinetic energy of the vehicle 10 into electrical energy using "the first motor 21 and/or the second motor 22." The generated electric power is charged in the storage battery 31 and thereby the remaining capacity SOC increases.

When generating friction braking force, the ECU 40 controls the friction braking device 65 to give friction braking force to each of the wheels of the vehicle 10. In other words, the ECU 40 converts kinetic energy of the vehicle 10 into heat energy using the friction braking device 65. The above-mentioned "driving force control, braking force control and a control of the remaining capacity SOC in association with these" are attained by the CPU of the ECU 40 performing a "vehicle run control routine" which is not shown.

3. Downward Slope Control

When the vehicle 10 is running a downward slope, a driver demands large braking force frequently. Therefore, since a regenerated electric power amount becomes large, the remaining capacity SOC may increases and reach the remaining capacity upper limit Smax. When the remaining capacity SOC reaches the remaining capacity upper limit Smax, regenerative braking cannot be performed from a viewpoint of protection of the storage battery 32. As a result, since braking is performed by the friction braking device 65, kinetic energy of the vehicle 10 is not converted into electrical energy, but is converted into heat energy. As a result, when the vehicle 10 is running a downward slope, a situation where electric power that may be collected in the storage battery 31 cannot be collected may occur.

Therefore, when a downward slope segment (which may be referred to as a "target downward slope segment" hereafter) which fulfills a "downward slope segment condition" will be mentioned later exists in a scheduled traveling route of the vehicle 10, the ECU 40 performs a control in which the remaining capacity SOC has been decreased before a starting point of the downward slope segment, i.e., a downward slope control.

More specifically, after a scheduled traveling route of the vehicle 10 is determined by a driver operating the display device 64, the CPU of the ECU 40 judges whether a downward slope segment (target downward slope segment) exists in the scheduled traveling route. The target downward slope segment is a segment where it is expected that a regenerated electric power amount obtained by the vehicle 10 running the segment becomes larger than an "electric power amount S20 equivalent to a predetermined ratio (for example, 20%) of the maximum charge amount (namely, an amount of accumulated electricity when the remaining capacity SOC is 100%) of the storage battery 31."

[Downward Slope Segment Condition]

A distance between a starting point and a ending point of a downward slope segment is longer than a distance threshold Dth1, an elevation of the starting point is beyond a height threshold Hth higher than an elevation of the ending point (the elevation of the starting point is higher than the elevation of the ending point, and a magnitude of a difference in the elevation between the starting point and the ending point is larger than the threshold Hth).

Figure 3:
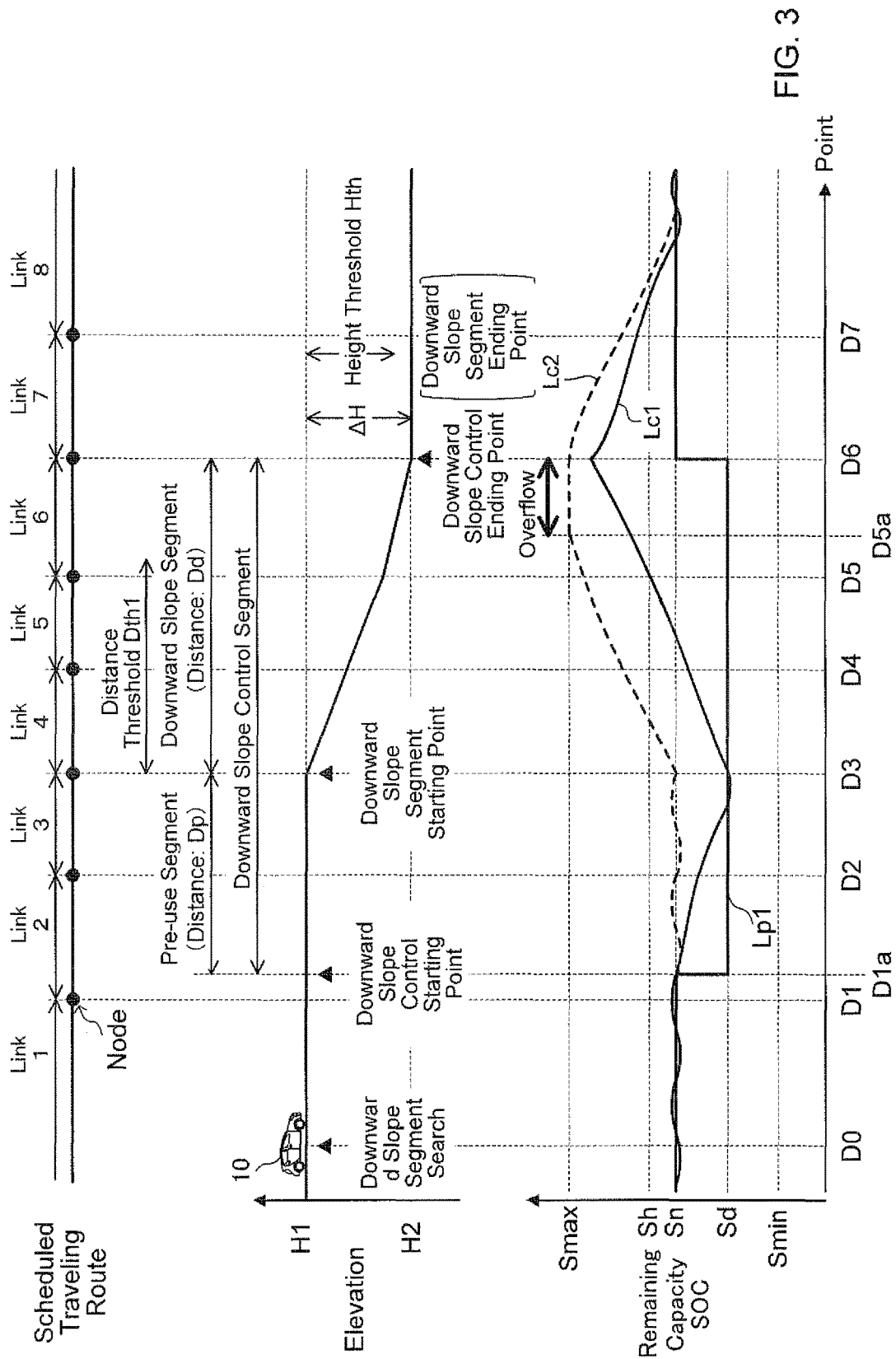
FIG. 3 is a graph for showing a change of a remaining capacity when a vehicle runs a downward slope segment.

For example, in an example shown in FIG. 3, links which constitute a scheduled traveling route of the vehicle 10 are link 1 to link 8. Furthermore, a distance Dd of a segment consisting of the link 4 to the link 6 is longer than the distance threshold Dth1. In addition, an elevation of a starting point of the segment consisting of the link 4 to the link 6 (namely, a starting point D3 of the link 4) is H1, an elevation of the ending point of the segment consisting of the link 4 to the link 6 (namely, an ending point D6 of the link 6) is H2, and the elevation H1 of the starting point is beyond the height threshold Hth higher than the elevation H2 of the ending point ($\Delta H=H1-H2>Hth$). Therefore, the segment constituted by the link 4 to the link 6 corresponds to a downward slope segment (target downward slope segment). Roads corresponding to the link 1 to the link 3, the link 7 and the link 8 are flat roads.

In a case where the CPU judges that the downward slope segment (target downward slope segment) exists in the scheduled traveling route, the CPU starts a downward slope control when the vehicle 10 arrives at a point (point D1$a$) a predetermined pre-use distance (first distance) Dp in front of the starting point (point D3) of the downward slope segment. The downward slope control is a control in which the target remaining capacity SOC* that is set to the standard remaining capacity Sn at normal time is set to the low-side remaining capacity Sd that is a predetermined value $\Delta$Sd smaller than the standard remaining capacity Sn (refer to polygonal line Lp1 in FIG. 3).

When the vehicle 10 arrives at the ending point (point D6) of the downward slope segment, the CPU ends the downward slope control by returning the target remaining capacity SOC* to the standard remaining capacity Sn from the low-side remaining capacity Sd.

A segment from the "point (point D1$a$) the pre-use distance Dp in front of the starting point (point D3) of the downward slope segment" to the "starting point (point D3) of the downward slope segment" may be referred to as a pre-use segment. Furthermore, a combined segment (the point D1$a$ to the point D6) of the pre-use segment and the downward slope segment may be referred to as a "downward slope control segment."

As a result, when the downward slope control is performed, the remaining capacity SOC changes as shown by a solid line LC1 in FIG. 3. On the contrary, when the downward slope control is not performed, the remaining capacity SOC changes as shown in a broken line LC2 in FIG. 3. As apparent form FIG. 3, since the remaining capacity SOC reaches the remaining capacity upper limit Smax at a time point when the vehicle 10 arrives at a point D5$a$ in the link 6 in a case where the downward slope control is not performed, regenerative electric power cannot be collected after the point D5$a$.

On the contrary, when the downward slope control is performed, since the target remaining capacity SOC* is set to the low-side remaining capacity Sd in the pre-use segment, the remaining capacity SOC falls lower than the standard remaining capacity Sn. Therefore, even when the remaining capacity SOC increases in the downward slope segment, the remaining capacity SOC does not reach the remaining capacity upper limit Smax. As a result, the amount of regenerative electric power which can be collected in the downward slope segment becomes large. Furthermore, priority is given to the EV running over the HV running (running using output power of the second motor 22 and engine 23) in the pre-use segment. Therefore, fuel consumption of the vehicle 10 is improved.

A segment in which the target remaining capacity SOC* is set to the low-side remaining capacity Sd (namely, a segment in which the downward slope control is performed) just has to include a segment from the starting point of the pre-use segment to the ending point of the pre-use segment (namely, the starting point of the downward slope segment), and the target remaining capacity SOC* may be returned to the standard remaining capacity Sn in the middle of the downward slope segment. In other words, what is necessary is just to set the target remaining capacity SOC* to the low-side remaining capacity Sd in the first segment including at least a "segment from the starting point of the downward slope control to the starting point of the downward slope segment" of a segment from the starting point of the downward slope control (starting time point of the pre-use segment) which is the predetermined first distance in front of the starting point of the downward slope segment included in the scheduled traveling route to the ending point of the downward slope segment. The above is an outline of the downward slope control.

4. Congestion Control

On the other hand, when the vehicle 10 runs a congested segment, an opportunity to run only with output power of the second motor 22 without using output power of the engine 23 (opportunity of the EV running) increases. Furthermore, a regenerated electric power amount in the congested segment is not large. As a result, since a case where the remaining capacity SOC falls and reaches the remaining capacity lower limit Smin while the vehicle 10 is running the congested segment and consequently the "compulsory charging" is performed occurs, the fuel consumption gets worse.

Then, the ECU 40 performs a control in which the remaining capacity SOC has been raised before the starting point of the congested segment, i.e., the congestion control, when a congested segment that fulfills the "congested segment condition" which will be mentioned later (which may be referred to as a "target congested segment" hereafter) exists in the scheduled traveling route of the vehicle 10.

More specifically, after a scheduled traveling route is determined by a driver's operation, the CPU of the ECU 40 judges whether a congested segment (target congested segment) exists in the scheduled traveling route. The target congested segment is a segment where it is expected that the remaining capacity SOC is decreased by an electric power amount larger than an "electric power amount S20 equivalent to a predetermined ratio (for example, 20%) of the maximum charge amount of the storage battery 31" by the vehicle 10 running the segment.

[Congested Segment Condition]

It is a segment which a road and traffic information communication system identifies as being delayed (congested) (for example, a segment where average vehicle speed is several km/h or less), and a distance between a starting point and an ending point of the segment is longer than distance threshold Dth2.

Figure 4:
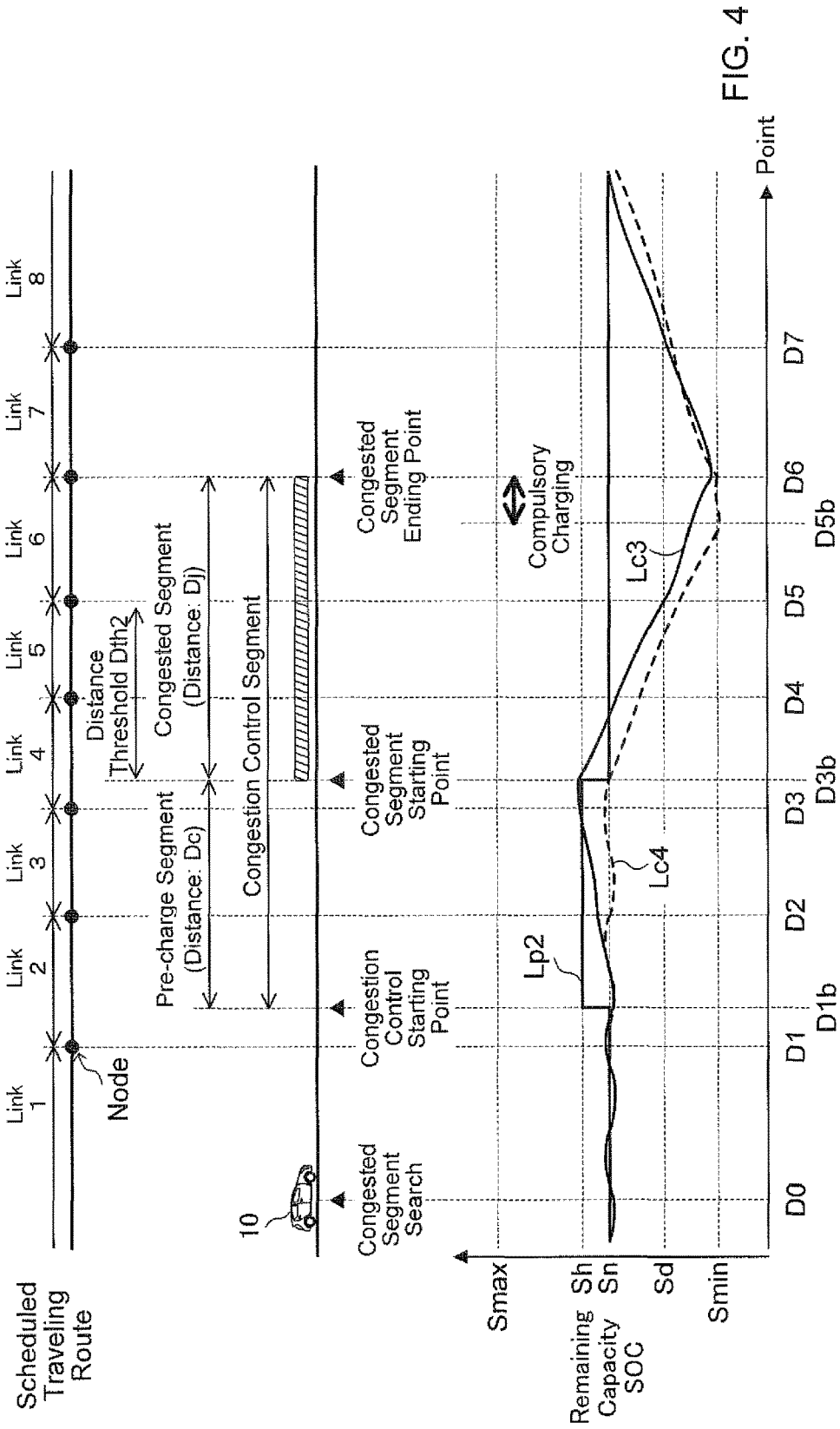
FIG. 4 is a graph for showing a change of a remaining capacity when a vehicle runs a congested segment.

For example, in an example shown in FIG. 4, links which constitute a scheduled traveling route of the vehicle 10 are link 1 to link 8, and roads corresponding to the respective links are flat roads. Furthermore, a traffic congestion occurs in a segment between a point D3$b$ and a point D6. A distance Dj between a starting point D3$b$ and an ending point D6 of this segment is longer than a distance threshold Dth2. Therefore, a segment from the starting point D3$b$ to the ending point D6 is a congested segment (target congested segment). When the above-mentioned downward slope control and congestion control are not performed, the CPU sets the target remaining capacity SOC* to the standard remaining capacity Sn.

When the CPU judges that the congested segment (target congested segment) exists in the scheduled traveling route, the CPU starts a congestion control when the vehicle 10 arrives at a point (point D1$b$; a congestion control starting point) a predetermined pre-charge distance (second distance) Dc in front of the starting point (point D3$b$) of the congested segment. The congestion control is a control in which the target remaining capacity SOC* that is set to the standard remaining capacity Sn at normal time is set to the high-side remaining capacity Sh that is a predetermined value $\Delta$Sh larger than the standard remaining capacity Sn (refer to polygonal line Lp2 in FIG. 4).

When the vehicle 10 arrives at the starting point (point D3b) of the congested segment, the CPU ends the congestion control by returning the target remaining capacity SOC* to the standard remaining capacity Sn from the high-side remaining capacity Sh.

A segment from the "point (point D1b) the pre-charge distance Dc in front of the starting point (point D3b) of the congested segment" to the "starting point (point D3b) of the congested segment" may be referred to as a pre-charge segment or a second segment.

As a result, when the congestion control is performed, the remaining capacity SOC changes as shown by a solid line LC3 in FIG. 4. On the contrary, when the congestion control is not performed, the remaining capacity SOC changes as shown in a broken line LC4 in FIG. 4. As apparent form FIG. 4, since the remaining capacity SOC reaches the remaining capacity lower limit Smin at a time point when the vehicle 10 arrives at a point D5b in the link 6 in a case where the downward slope control is not performed, the CPU performs the compulsory charging using output power of the engine 23. As a result, fuel consumption of the vehicle 10 gets worse.

On the contrary, when the congestion control is performed, since the target remaining capacity SOC* is set to the high-side remaining capacity Sh in the pre-charge segment, the remaining capacity SOC increases higher than the standard remaining capacity Sn. As a result, even when the remaining capacity SOC decreases in the congested segment, a possibility that the remaining capacity SOC does not reach the remaining capacity lower limit Smin is high. As a result, since the compulsory charging using output power of the engine 23 becomes unlikely to be performed, fuel consumption of the vehicle 10 is improved.

5. Extended Regeneration Control

For example, when a slam-on-the-brake operation is carried out just before a stop line in a case where a driver stops a vehicle at a point of intersection, etc., it is necessary to temporarily give large braking force to wheels. Since there is an upper limit in a charging electric current which can be passed through the storage battery 31, regenerative braking force is also restricted so that charging electric current does not exceed the upper limit. Furthermore, since demand braking force may temporarily exceed the maximum value of regenerative braking force at the time of a slam-on-the-brake operation, insufficiency of braking force is compensated with friction braking force by the friction braking device 65. Therefore, energy which must have been able to be collected in the storage battery 31 as electrical energy by regenerative braking if a driver did not perform a slam-on-the-brake operation by starting a brake operation earlier is released wastefully in the form of heat energy generated in the friction braking device 65 by the slam-on-the-brake operation.

Figure 5:
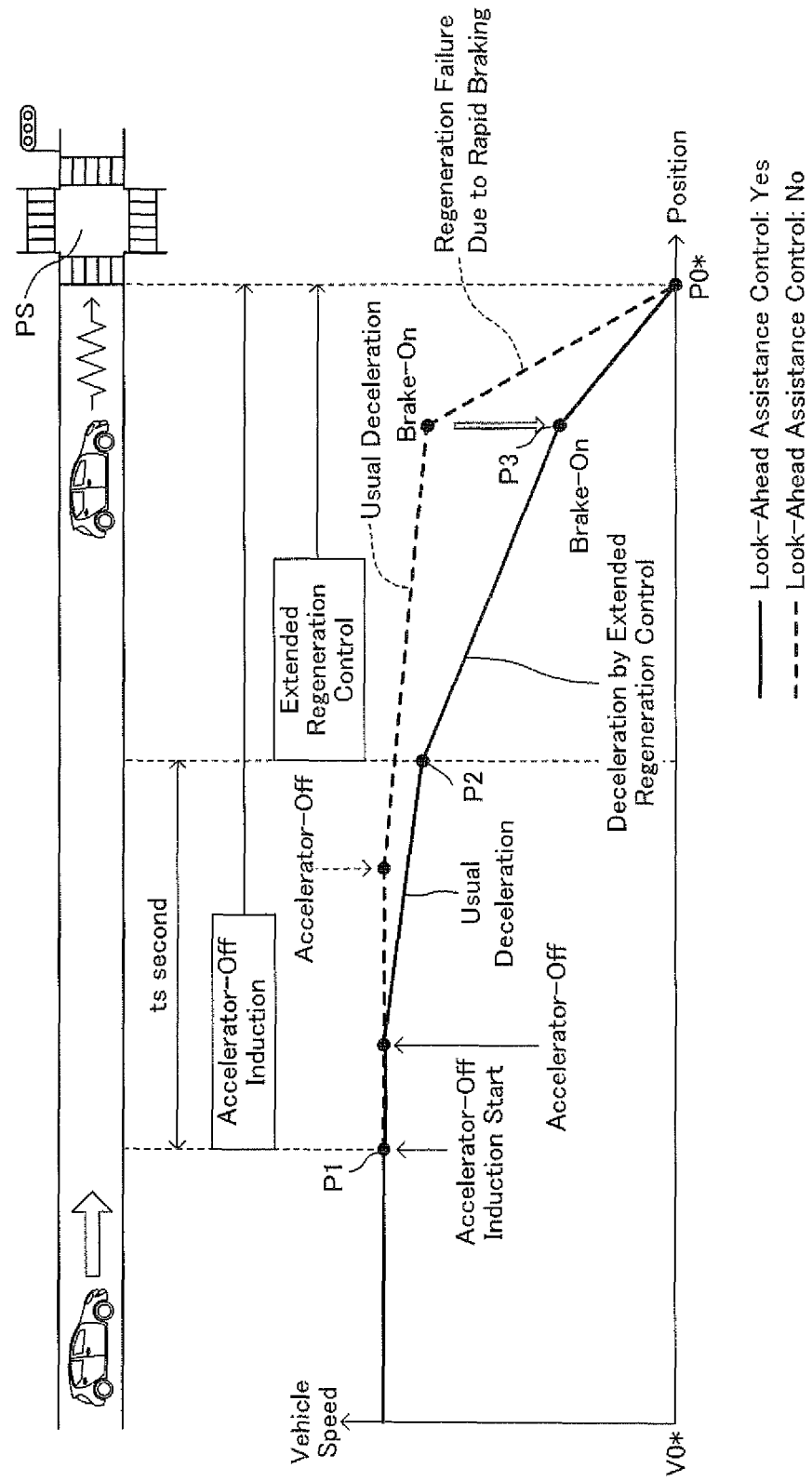
FIG. 5 is a diagram for schematically showing transition of vehicle speed when a vehicle slows down.

In order to reduce such a useless heat energy release, the CPU of the ECU 40 predicts a situation where a driver performs a brake operation, at least based on a current position Pn of a vehicle (own-vehicle), and performs an accelerator-off induction at predetermined timing (refer to a point P1 in FIG. 5). The accelerator-off induction is to performing notification for impelling a driver to release the accelerator pedal 56 (reset treading force to the accelerator pedal) using the display device 65. By the accelerator-off induction, almost all drivers release the accelerator pedal 56.

On or after a time point (refer to a point P2 in FIG. 5) a predetermined time (ts second) after the starting time point (refer to the point P1) of the accelerator-off induction, the CPU increases regenerative braking force when the accelerator pedal 56 is released (regenerative braking force equivalent to what is called engine braking) larger than usual, and increase regenerated energy to the storage battery 31. As a result, since the vehicle speed Vs at the time point when a driver starts a brake operation (refer to a point P3 of FIG. 5) becomes low enough, the brake operation amount Bp thereafter becomes small. Therefore, since much of demand braking force can be covered with regenerative braking force, the amount of emission (release) of heat energy by the friction braking device 65 can be decreased, and more electrical energy can be collected. Therefore, fuel consumption of the vehicle 10 is improved.

More specifically, the CPU of ECU 40 learns a position (location) on a map where a driver releases a brake pedal with a high frequency based on the driver's everyday driving operation, and registers the learned position into a nonvolatile memory as a target deceleration ending position. Moreover, the CPU registers vehicle speed Vs at the time of arriving at the target deceleration ending position into a nonvolatile memory as target deceleration ending vehicle speed in association with the target deceleration ending position. As a position which will be learned as the target deceleration ending position with a high possibility, a stopping position in a point of intersection and a position where a driver shifts his/her foot from a brake pedal to an accelerator pedal when beginning to escape from a curved track in a case that the running track is curved, etc. can be mentioned.

The CPU judges whether the target deceleration ending position registered as mentioned above exists within a predetermined distance (for example, hundreds of meters) from a position of the vehicle 10 at present in a road on a scheduled traveling route of the vehicle 10. And, when the judgment result is affirmative (positive), the CPU sets the target deceleration ending position as a target deceleration ending position P0*, and reads out a target deceleration ending vehicle speed V0* corresponding to the set target deceleration ending position P0* from a nonvolatile memory.

The CPU determines timing to start an accelerator-off induction based on the target deceleration ending position P0* and the target deceleration ending vehicle speed V0* in accordance with a procedure which will be explained later in detail. And, the CPU starts the accelerator-off induction at accelerator-off induction timing (refer to a point P1 in FIG. 5).

Furthermore, the CPU sets the regenerative braking force to a value larger than the "regenerative braking force when the accelerator pedal 56 is released at normal time" and, thereby, increases deceleration of the vehicle, from a time point Ts (refer to a point P2 in FIG. 5) when the accelerator pedal 56 is actually released after the accelerator-off induction timing and ts seconds has passed since the accelerator-off induction timing. Namely, the CPU increases regenerated energy after the time point Ts. Thus, the "extended regeneration control" is a control in which regenerated energy is increased so that deceleration of a vehicle becomes large when the accelerator-off induction is carried out and the accelerator pedal 56 is released thereafter.

Since vehicle speed at a time point of brake-on when a driver operates the brake pedal 56 becomes small by this extended regeneration control (refer to a point P3 in FIG. 5), an amount of heat energy released at the friction braking device 65 by a subsequent brake operation decreases. In other words, more electrical energy can be collected by regenerative braking. As a result, fuel consumption of the vehicle 10 can be improved.

6. Problems when Using Downward Slope Control and/or Congestion Control with Extended Regeneration Control By the way, when an existence of the downward slope segment (target downward slope segment) is expected on the scheduled traveling route, the CPU performs the downward slope control. Namely, as shown by a solid line Lp10 in FIG. 6, when the vehicle 10 arrives at a starting point (D1a) of a pre-use segment, the CPU changes the target remaining capacity SOC* to the low-side remaining capacity Sd from the standard remaining capacity Sn, and starts the downward slope control. As a result, as shown a broken line Lc10, the remaining capacity SOC falls and approaches the low-side remaining capacity Sd in the pre-use segment.

Figure 6:
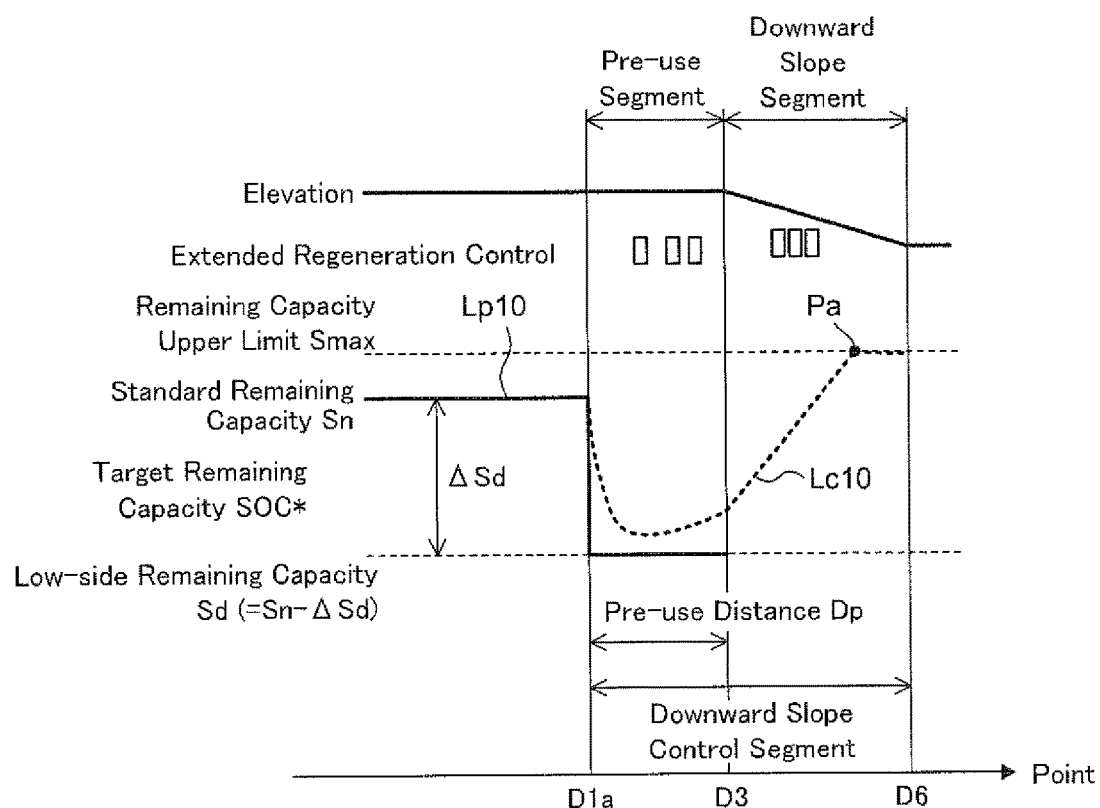
FIG. 6 is a graph for showing a change of a remaining capacity in a case where a downward slope control and an extended regeneration control are performed together.

However, as shown by quadrangles in FIG. 6, the extended regeneration control may be performed once or more during a period when the downward slope control is being performed (in the downward slope control segment). In this case, when the extended regeneration control is performed in the pre-use segment, the remaining capacity SOC does not sufficiently decreased to the low-side remaining capacity Sd. Furthermore, when the extended regeneration control is performed in the downward slope segment, a rise amount of the remaining capacity SOC is increased beyond assumption. From the above, a case where the remaining capacity SOC reaches the remaining capacity upper limit Smax occurs (refer to a point Pa). As a result, a situation where electrical energy which may be able to be collected in the storage battery 31 cannot be collected occurs.

On the other hand, when an existence of the congested segment (target congested segment) is expected on the scheduled traveling route, the CPU performs the congestion control. Namely, as shown by a solid line Lp11 in FIG. 7, when the vehicle 10 arrives at a starting point (D1b) of a pre-charge segment, the CPU changes the target remaining capacity SOC* to the high-side remaining capacity Sh from the standard remaining capacity Sn, and starts the congestion control. As a result, as shown by a broken line Lc11, the remaining capacity SOC increases and approaches the high-side remaining capacity Sh in the pre-charge segment.

Figure 7:
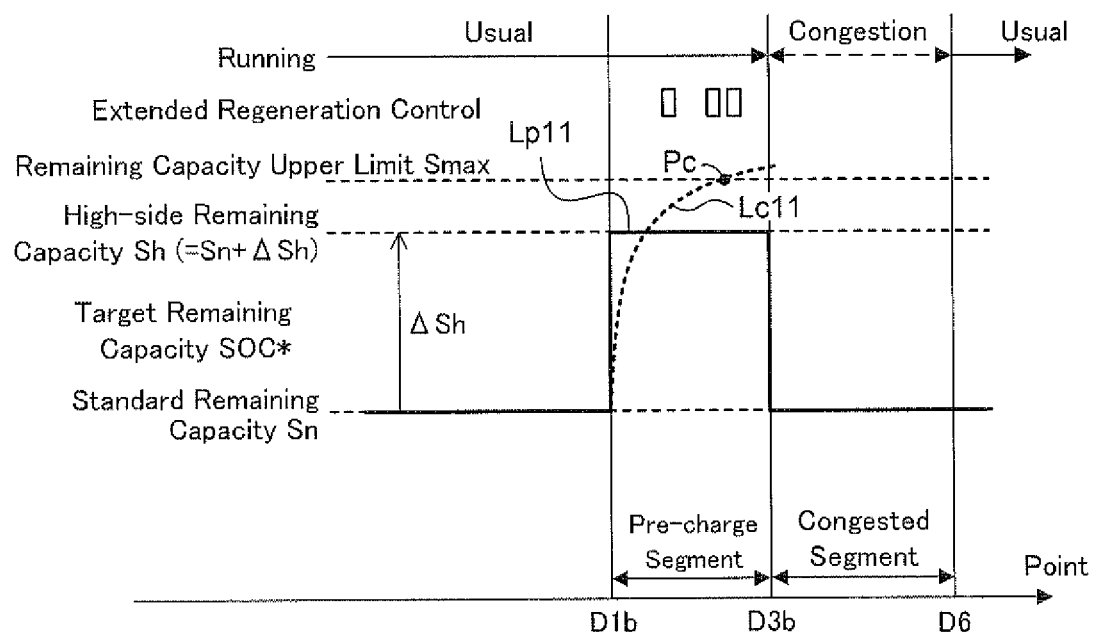
FIG. 7 is a graph for showing a change of a remaining capacity in a case where a congestion control and an extended regeneration control are performed together.

However, as shown by quadrangles in FIG. 7, the extended regeneration control may be performed once or more during a period when the vehicle 10 is running the pre-charge segment. In this case, since the remaining capacity SOC has become near the high-side remaining capacity Sh, a case where the remaining capacity SOC reaches the remaining capacity upper limit Smax occurs (refer to a point Pc). In this case, it means that the engine 23 was operated unnecessarily in the pre-charge segment in order to bring the remaining capacity SOC close to the high-side remaining capacity Sh. Furthermore, since the remaining capacity SOC reaches the remaining capacity upper limit Smax, it means that electrical energy which can be collected on and after that time point is made useless.

Figure 8:
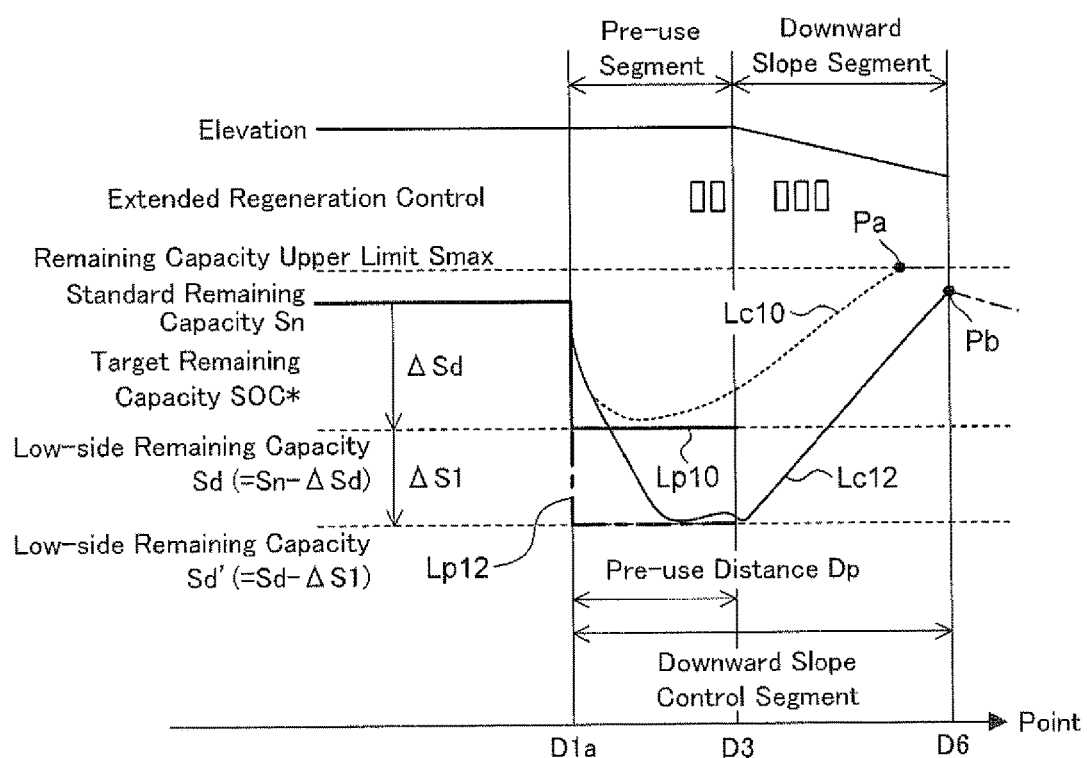
FIG. 8 is a graph for explaining an operation of the present control device in a case where a downward slope control and an extended regeneration control are performed together.

7. Parallel Usage of Downward Slope Control and/or Congestion Control with Extended Regeneration Control by Present Control Device The present control device solves the above-mentioned problem as follows. Namely, as shown in FIG. 8, the present control device foresees an increase of the remaining capacity SOC in association with an increase of regenerated electric power amount due to the extended regeneration control, and sets the target remaining capacity SOC* in the pre-use segment to a "value Sd' the first adjustment amount ΔS1 smaller than the low-side remaining capacity Sd", when it is expected that the extended regeneration control is performed while the vehicle 10 is running the downward slope control segment. This value Sd' may be referred to as a corrected low-side remaining capacity.

Since the remaining capacity SOC sufficiently falls in the pre-use segment by this as shown by a solid line Lc12 in FIG. 8, a possibility that the remaining capacity SOC may reach the remaining capacity upper limit Smax is low even when the extended regeneration control is performed in the downward slope segment (refer to a point Pb). As a result, a possibility that a situation where electrical energy which may be able to be collected in the storage battery 31 cannot be collected may occurs can be decreased.

Figure 9:
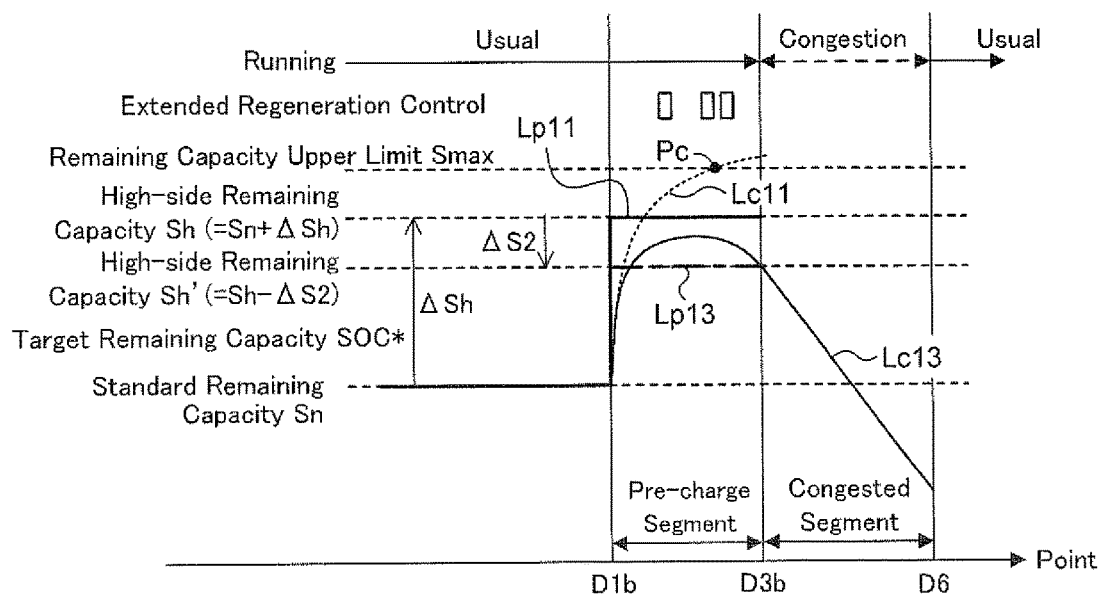
FIG. 9 is a graph for explaining an operation of the present control device in a case where a congestion control and an extended regeneration control are performed together.

Furthermore, as shown in FIG. 9, the present control device foresee an increase of the remaining capacity SOC in association with an increase of regenerated energy due to the extended regeneration control and sets the target remaining capacity SOC* in the pre-charge segment to a "value Sh' which is larger than the standard remaining capacity SOC* and the second adjustment amount ΔS2 smaller than the high-side remaining capacity Sh" when it is expected that the extended regeneration control is performed in a period when the vehicle 10 is running the pre-charge segment for the congestion control. This value Sh' may be referred to as a corrected high-side remaining capacity.

In accordance with this, as shown by a solid line Lc13 in FIG. 9, even when the extended regeneration control is performed in the pre-charge segment, a possibility that the remaining capacity SOC may reach the remaining capacity upper limit Smax becomes low. As a result, a possibility that the engine 23 may generate useless output power in order to bring the remaining capacity SOC close to the high-side remaining capacity Sh which is not corrected and therefore still high, and a possibility that a situation where electrical energy which should have been able to be collected in the storage battery 31 cannot be collected may occur can be reduced.

(Specific Operation)

Next, a specific operation of the present control device will be explained. The CPU of ECU 40 repeatedly performs a routine shown in FIG. 10 at a predetermined time interval. Therefore, when it comes to predetermined timing, the CPU starts processing from step S100 in FIG. 10 and progresses to step S101, and acquires a scheduled traveling route of the vehicle 10. Next, the CPU progresses to step S102, and judges whether the "downward slope segment (target downward slope segment) which fulfills the above-mentioned downward slope segment condition" is included in the scheduled traveling route of the vehicle 10 at present.

When the downward slope segment is not included in the scheduled traveling route, the CPU judges at step S102 as "No" and progresses to step S103, and sets the target remaining capacity SOC* to the standard remaining capacity Sn. Thereafter, the CPU progresses to step S109, and once ends this routine. As a result, by performing a "vehicle run control routine" which is not shown, the CPU controls the first motor 21, the second motor 22 and the engine 23 so that driving force (torque) required for the vehicle 10 is satisfied and the remaining capacity SOC is brought close to the standard remaining capacity Sn.

In a case where the downward slope segment is included in the scheduled traveling route at a time point when the CPU performs processing of step S102, the CPU judges at step S102 as "Yes." Then, the CPU progresses to step S104, and judges (predicts) whether a point where the extended regeneration control is performed exists in the downward slope control segment corresponding to the downward slope segment (segment consisting of a combination of the pre-use segment and the downward slope segment). More specifically, the CPU judges whether the above-mentioned target deceleration ending position exists in a segment within a predetermined distance (for example, hundreds of meters) from the current position of the vehicle 10 on the scheduled traveling route of the vehicle 10, and judges whether the target deceleration ending position is in the downward slope control segment when the target deceleration ending position exists. When the point where the extended regeneration control is performed exists in the downward slope control segment, it can be presumed that electric power amount charged in the storage battery 31 by the extended regeneration control in the downward slope control segment is larger than the first threshold electric power amount.

When the CPU judges that any point where the extended regeneration control is performed does not exists in the downward slope control segment, the CPU progresses to step S105 from step S104, sets the low-side remaining capacity Sd to a "value which is obtained by subtracting a predetermined value ΔSd from the standard remaining capacity Sn (=Sn−ΔSd)", and progresses to step S107.

On the contrary, when the CPU judges that a point where the extended regeneration control is performed exists in the downward slope control segment, the CPU progresses to step S106 from step S104, sets the low-side remaining capacity Sd to the "corrected low-side remaining capacity Sd (=(Sn−ΔSd)−ΔS1)", and progresses to step S107.

The CPU judges whether a current position of the vehicle 10 is in the downward slope control segment (namely, the pre-use segment and the downward slope segment) at step S107. When the current position of the vehicle 10 is in the downward slope control segment, the CPU judges at step S107 as "Yes" and progresses to step S108, and sets the target remaining capacity SOC* to the "low-side remaining capacity Sd set at step S105 or step S106." On the other hand, when the current position of the vehicle 10 is not in the downward slope control segment, the CPU judges at step S107 as "No" and progresses to step S103, and sets the target remaining capacity SOC* to the standard remaining capacity SOC*.

As a result, when the current position of the vehicle 10 is not in the downward slope control segment, by the CPU performing the "vehicle run control routine" which is not shown, the first motor 21, the second motor 22 and the engine 23 are controlled so that the driving force (torque) required for the vehicle 10 is satisfied and the remaining capacity SOC is brought close to the standard remaining capacity Sn. Furthermore, when the current position of the vehicle 10 is in the downward slope control segment, the first motor 21, the second motor 22 and the engine 23 are controlled so that the driving force (torque) required for the vehicle 10 is satisfied and the remaining capacity SOC is brought close to the "low-side remaining capacity Sd set up at step S105 or step S106."

As can be understood from the above, since the remaining capacity SOC at the downward slope starting point is sufficiently decreased even in a case where the extended regeneration control is performed in the downward slope control segment, a possibility that the remaining capacity SOC may reach the remaining capacity upper limit Smax in the downward slope segment can be lowered. Therefore, a probability of occurrence of a situation where electrical energy which may be able to be collected in the storage battery 31 cannot be collected can be decreased.

Figure 11:
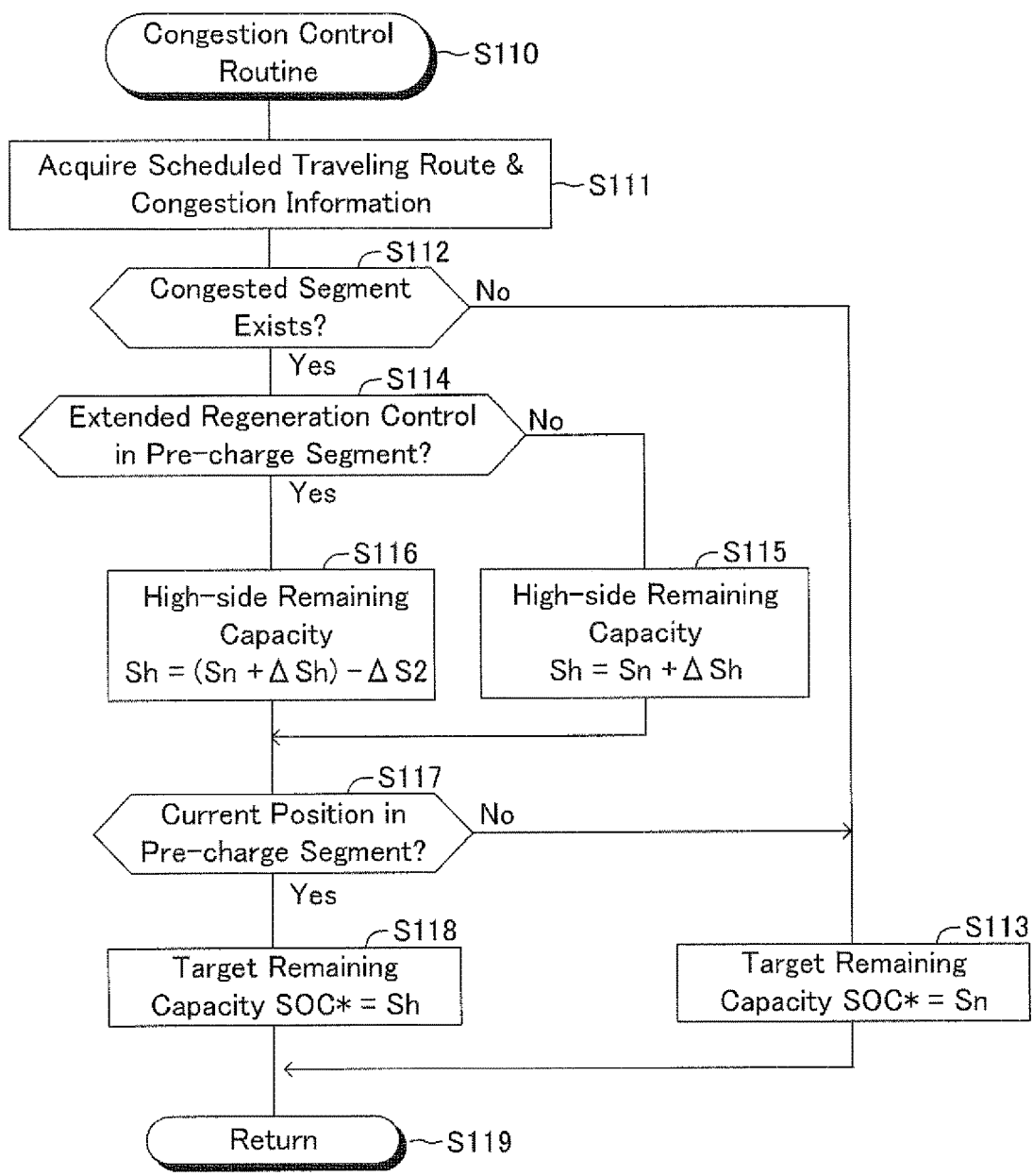
FIG. 11 is a flowchart for showing a congestion control routine which the CPU shown in FIG. 1 performs.

Furthermore, the CPU of the ECU 40 repeatedly performs a routine shown in FIG. 11 at a predetermined time interval. Therefore, when it comes to predetermined timing, the CPU starts processing from step S110 in FIG. 11 and progresses to step S111, and acquires road information including the scheduled traveling route of the vehicle 10 and congestion information. Next, the CPU progresses to step S112, and judges whether the "congested segment which fulfills the above-mentioned congested segment condition (target congested segment)" is included in the scheduled traveling route of the vehicle 10 at present.

When the congested segment is not included in the scheduled traveling route, the CPU judges at step S112 as "No" and progresses to step S113, and sets the target remaining capacity SOC* to the standard remaining capacity Sn. Thereafter, the CPU progresses to step S119, and once ends this routine. As a result, by the CPU performing a "vehicle run control routine" which is not shown, the first motor 21, the second motor 22 and the engine 23 are controlled so that the driving force (torque) required for the vehicle 10 is satisfied and the remaining capacity SOC is brought close to the standard remaining capacity Sn.

In a case where the congested segment is included in the scheduled traveling route at a time point when the CPU performs the processing of step S112, the CPU judges at step S112 as "Yes." Then, the CPU progresses to step S114, and judges (predicts) whether a point where the extended regeneration control is performed exists in the pre-charge segment corresponding to the congested segment. More specifically, the CPU judges whether the above-mentioned target deceleration ending position exists in a segment within a predetermined distance (for example, hundreds of meters) from the current position of the vehicle 10 on the scheduled traveling route of the vehicle 10, and judges whether the target deceleration ending position is in the pre-charge segment when the target deceleration ending position exists. When a point where the extended regeneration control is performed exists in the pre-charge segment, it can be presumed that the electric power amount charged in the storage battery 31 by the extended regeneration control in the pre-charge segment is larger than the second threshold electric power amount.

When the CPU judges that any point where the extended regeneration control is performed does not exists in the pre-charge segment, the CPU progresses to step S115 from step S114, sets the high-side remaining capacity Sh to a "value which is obtained by adding a predetermined value ΔSh to the standard remaining capacity Sn (=Sn+ΔSh)", and progresses to step S117.

On the contrary, when the CPU judges that a point where the extended regeneration control is performed exists in the congested segment, the CPU progresses to step S116 from step S114, sets the high-side remaining capacity Sh to the "corrected high-side remaining capacity Sh' (=(Sn+ΔSh)−ΔS2)", and progresses to step S117.

The CPU judges whether the current position of the vehicle 10 is in the pre-charge segment at step S117. When the current position of the vehicle 10 is in the pre-charge segment, the CPU judges at step S117 as "Yes" and progresses to step S118, and sets the target remaining capacity SOC* to the "high-side remaining capacity Sh set at step S115 or step S116." On the other hand, when the current position of the vehicle 10 is not in the pre-charge segment, the CPU judges at step S117 as "No" and progresses to step S113, and sets the target remaining capacity SOC* to the standard remaining capacity SOC*.

As a result, when the current position of the vehicle 10 is not in the pre-charge segment, by the CPU performing a "vehicle run control routine" which is not shown, the first motor 21, the second motor 22 and the engine 23 are controlled so that the driving force (torque) required for the vehicle 10 is satisfied and the remaining capacity SOC is brought close to the standard remaining capacity Sn. Furthermore, when the current position of the vehicle 10 is in the pre-charge segment, the first motor 21, the second motor 22 and the engine 23 are controlled so that the driving force (torque) required for the vehicle 10 is satisfied and the remaining capacity SOC is brought close to the "high-side remaining capacity Sh set at step S115 or step S116."

As can be understood from the above, since the remaining capacity SOC in the pre-charge segment is not excessively raised even in a case where the extended regeneration control is performed in the pre-charge segment, a possibility that the remaining capacity SOC may reach the remaining capacity upper limit Smax in the pre-charge segment can be lowered. Therefore, in the pre-charge segment, a possibility that a situation where the engine 23 generates useless output power and electrical energy should have been able to be collected in the storage battery 31 cannot be collected may occur can be reduced.

Figure 12:
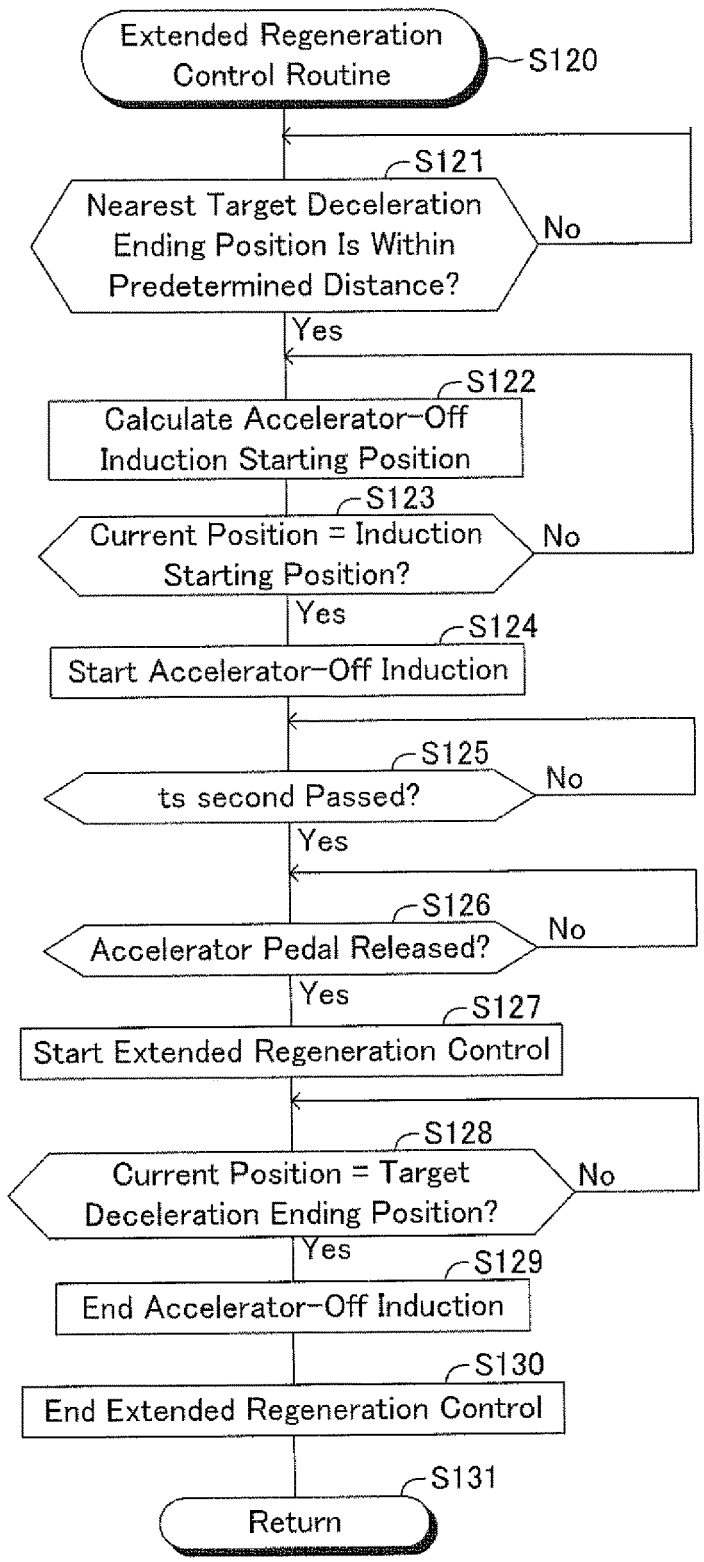
FIG. 12 is a flowchart for showing an extended regeneration control routine which the CPU shown in FIG. 1 performs.

Furthermore, the CPU of the ECU 40 repeatedly performs a routine (extended regeneration control routine) shown in FIG. 12 at a predetermined time interval. However, even in a case where the routine in FIG. 12 is being performed, when it comes to timing when another routine is performed, the CPU performs the (another) routine by an interrupt handling.

When it comes to predetermined timing, the CPU starts processing from step S120 in FIG. 12, and judges whether a distance to the "nearest target deceleration ending position P0* on the scheduled traveling route of the vehicle 10" from a "current position of the vehicle 10" has become a predetermined distance or less. This predetermined distance has been set to a distance so that timing when the vehicle 10 arrives at a position this position in front of the latest target deceleration ending position P0* is sufficiently earlier than timing the accelerator-off induction is performed. The CPU repeats the processing of step S121 until the judgment at step S121 becomes affirmative (positive).

Figure 13:
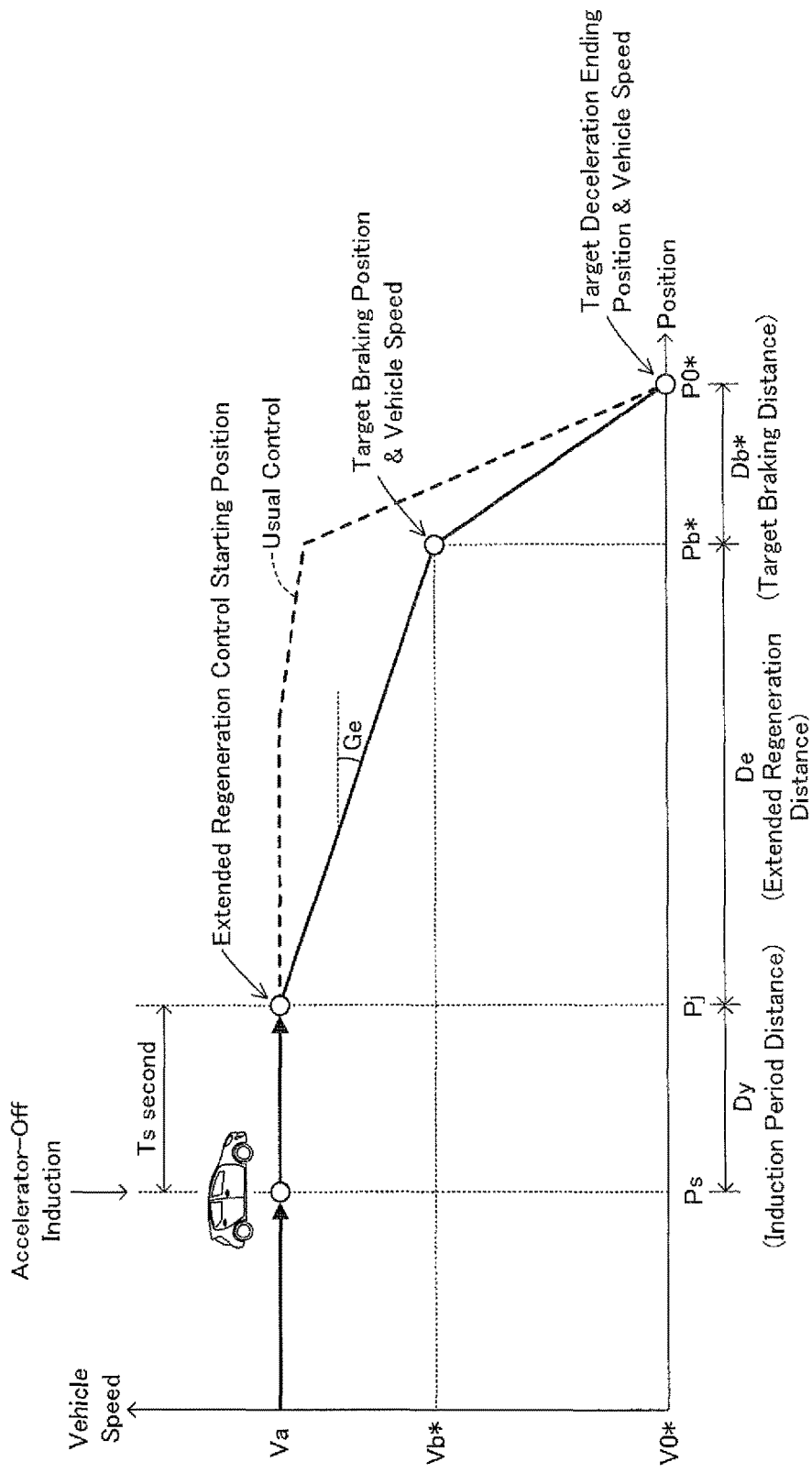
FIG. 13 is a diagram for explaining the extended regeneration control routine which the CPU shown in FIG. 1 performs.

When the CPU judges at step S121 as "Yes", the CPU progresses to step S122, and calculates a position (accelerator-off induction position) Ps where an accelerator-off induction is performed based on the target deceleration ending position P0* and the target deceleration ending vehicle speed V0* (refer to FIG. 13).

More specifically, as mentioned above, the target deceleration ending position P0* is a position where it is predicted that a vehicle stops or a position where it is predicted that deceleration of a vehicle is completed on a curve road traveling, and is registered into the nonvolatile memory by learning. The target deceleration ending vehicle speed V0* is zero when the target deceleration ending position P0* is a stopping position, for example, and is registered into the nonvolatile memory by learning.

The CPU calculates "a target braking position Pb* and a target braking vehicle speed Vb*" shown in FIG. 13 based on the target deceleration ending position P0* and the target deceleration ending vehicle speed V0*. The target braking position Pb* is equivalent to a starting position of a brake pedal operation in a case where an ideal driver (model driver) who does not wastefully consume energy decelerates the vehicle 10 at predetermined deceleration so that vehicle speed when the vehicle 10 reaches the target deceleration ending position P0* becomes identical to the target deceleration ending vehicle speed V0*.

Therefore, when the target deceleration ending vehicle speed V0* is given, a distance from the target braking position Pb* to the target deceleration ending position P0* (which will be referred to as a "target braking distance Db*" hereafter) and the target braking vehicle speed Vb* are determined uniquely. Then, the ECU 40 stores a previously determined relation between the target deceleration ending vehicle speed V0* and each of the target braking distance Db* and target braking vehicle speed Vb* into a ROM in the form of a look-up-table. Then, the CPU computes the target braking distance Db* and the target braking vehicle speed Vb* by applying an actual target deceleration ending vehicle speed V0* to the look-up-table. Furthermore, the CPU computes the target braking position Pb* from the target braking distance Db* and the target deceleration ending position P0*.

Next, based on "ideal deceleration Ge desired during the extended regeneration control", the target braking vehicle speed Vb* and current vehicle speed Va of the vehicle 10, the CPU obtains an extended regeneration distance De which is a distance for which the vehicle 10 should be decelerated at the ideal deceleration Ge, as follows.

The ideal deceleration Ge is a deceleration acquired at the time of accelerator-off, and is previously set to larger deceleration (negative acceleration with a large magnitude) than deceleration acquired at the time of the accelerator-off while traveling not under the extended regeneration control (usual traveling). Specifically, the deceleration at the time of the accelerator-off while usual traveling changes depending on vehicle speed. Therefore, the CPU calculates the ideal deceleration Ge by applying an average value of the actual vehicle speed Va of the vehicle 10 and the target braking vehicle speed Vb* to the look-up-table which specifies a relation between vehicle speed and the ideal deceleration Ge, as vehicle speed as an argument of the look-up-table.

From the above, since the target braking vehicle speed Vb* and the ideal deceleration Ge are obtained, the CPU obtains the extended regeneration distance De based on the following two formulas (refer to FIG. 13). In the following formulas, a=−Ge.

$$Vb^* = Va + a \cdot t$$

$$De = Va \cdot t + (\tfrac{1}{2}) \cdot a \cdot t^2$$

Furthermore, the CPU computes a position (extended regeneration control starting point) Pj where the extended regeneration control should be started, based on the extended regeneration distance De and the target braking position Pb*.

The timing when the accelerator-off induction is performed is set the predetermined time ts earlier than a time T when the vehicle 10 arrives at the extended regeneration control starting point Pj. Therefore, the CPU computes a distance which is obtained by multiplying the current vehicle speed Va of the vehicle 10 by the time ts as an induction period distance Dy, and obtains an accelerator-off induction starting position Ps from the extended regeneration control starting point Pj and the induction period distance Dy.

Next, the CPU progresses to step S123 in FIG. 12, and judges whether the current position of the vehicle 10 reaches the accelerator-off induction starting position Ps. The CPU repeats the processing of step S123 until the judgment at step S123 becomes affirmative (positive).

When the judgment at step S123 becomes affirmative (positive), the CPU progresses to step S124, and starts the accelerator-off induction. Subsequently, the CPU progresses to step S125, and judges whether the time ts has passed since the starting time point of the accelerator-off induction. The CPU repeats the processing of step S125 until the judgment at step S125 becomes affirmative (positive).

When the time ts has passed since the starting time point of the accelerator-off induction, the CPU judges at step S125 as "Yes" and progresses to step S126, and judges whether the accelerator pedal 56 is released (whether the accelerator-off is carried out). The CPU repeats the processing of step S126 until the judgment at step S126 becomes affirmative (positive).

When the accelerator pedal 56 has been released or the accelerator pedal 56 is released, the CPU judges at step S126 as "Yes" and progresses to step S127, and starts the extended regeneration control. More specifically, the CPU generates regenerative braking force so that actual deceleration of the vehicle 10 becomes identical to the ideal deceleration calculated as mentioned above.

Next, the CPU judges about whether the current position of the vehicle 10 reaches the target deceleration ending position P0*. The CPU repeats the processing of step S128 until the judgment at step S128 becomes affirmative (positive). Typically, a driver treads on a brake pedal in the middle of the extended regeneration control being performed. Thereby, the CPU generates regenerative braking force equal to the demand regenerative braking force according to the brake operation amount Bp, and generates friction braking force equal to the demand friction braking force according to the brake operation amount Bp with the friction braking device 65.

When the current position of the vehicle 10 reaches the target deceleration ending position P0*, the CPU judges at step S128 as "Yes", and performs processing of step S129 and processing of step S130 mentioned below in order, and progresses to step S131 and once end this routine. Thereafter, the CPU progresses to step S120.

Step S129: the CPU ends the accelerator-off induction.
Step S130: the CPU ends the extended regeneration control.

As explained above, in accordance with the present control device, in the first case where it is presumed that electric power amount charged in the storage battery 31 by the extended regeneration control in the downward slope control segment is larger than the first threshold electric power amount (refer to the judgment as "Yes" at step S104 in FIG. 10), the target remaining capacity SOC* set in the downward slope control segment is corrected to a value that is the first adjustment amount ΔS1 smaller than the target remaining capacity SOC* (namely, the low-side remaining capacity Sd=Sn−ΔSd) set when it is presumed that electric power amount charged in the storage battery 31 by the extended regeneration control in the downward slope control segment is smaller than the first threshold electric power amount (including a case where it is predicted that the extended regeneration control is not performed in the downward slope control segment) (step S106).

Therefore, since the remaining capacity SOC becomes a value small enough in the pre-use segment, even when the extended regeneration control is performed in a period when the vehicle 10 is running the pre-use segment and/or the downward slope segment (namely, the downward slope control segment), a possibility that the remaining capacity SOC may reach the remaining capacity upper limit Smax falls. Therefore, since a situation where electric power which should have been able to be collected in the storage battery cannot be collected does not occur while the vehicle is running the downward slope segment, fuel consumption of the vehicle 10 can be improved further.

Furthermore, in accordance with the present control device, in the second case where it is presumed that electric power amount charged in the storage battery 31 by the extended regeneration control in the pre-charge segment where the congestion control is performed is larger than the second threshold electric power amount (refer to the judgment as "Yes" at step S114 in FIG. 11), the target remaining capacity SOC* set in the pre-charge segment is corrected to a value that is the second adjustment amount ΔS2 smaller than the target remaining capacity SOC* (namely, the high-side remaining capacity Sh=Sn+ΔSh) set when it is presumed that electric power amount charged in the storage battery 31 by the extended regeneration control in the pre-charge segment is smaller than the second threshold electric power amount (including a case where it is predicted that the extended regeneration control is not performed in the pre-charge control segment) (step S116).

Therefore, even when the extended regeneration control is performed in the pre-charge segment, a possibility that the remaining capacity SOC may reach the remaining capacity upper limit Smax falls. Therefore, since a situation where electric power which should have been able to be collected in the storage battery cannot be collected does not occur, fuel consumption of the vehicle 10 can be improved further.

Although the present control device is configured to perform both "the downward slope control and the congestion control" as the look-ahead assistance control, it may perform either one of the downward slope control and the congestion control. In that case, when the present control device performs the downward slope control and does not perform the congestion control, the CPU performs the routine shown in FIG. 10 and does not perform the routine shown in FIG. 11. On the other hand, when the present control device performs the congestion control and does not perform the downward slope control, the CPU performs the routine shown in FIG. 11 and does not perform the routine shown in FIG. 10.

<First Modification of Embodiment>

Next, a first modification of the embodiment of the present invention will be explained. The control device for a hybrid vehicle according to the above-mentioned embodiment sets the low-side remaining capacity Sd, which is set as the target remaining capacity SOC*, to the "value the predetermined value ΔSd smaller than the standard remaining capacity Sn", when it is predicted that the extended regeneration control is performed in a period when the vehicle 10 is running the downward slope control segment.

On the contrary, the first modification is different from the above-mentioned embodiment in that the "low-side remaining capacity Sd set as the target remaining capacity SOC* when it is predicted that a predicted value of electric power amount charged in the storage battery by the extended regeneration control performed in a period when the vehicle 10 is running the downward slope control segment (which will be referred to as a "first predicted regenerated electric power amount" hereafter) is larger than an electric power amount threshold" is set to a "value a sum of a predetermined value ΔSd and a predetermined value (first adjustment amount) ΔS1a smaller than the standard remaining capacity Sn" and the predetermined value ΔS1a is adjusted according to magnitude of the first predicted regenerated electric power amount. More specifically, in the first modification, the larger the first predicted regenerated electric power amount is, the larger the above-mentioned predetermined value ΔS1a is set. In other words, in the first modification, the larger the first predicted regenerated electric power amount is, the smaller value the target remaining capacity SOC* is set to in the downward slope control in a range where it is larger than the remaining capacity lower limit Smin.

Furthermore, in detail, the CPU acquires one of the parameters X1 to X5 listed below as an index value X, and presumes that the larger the index value X is, the larger the first predicted regenerated electric power amount is. Then, the CPU sets the above-mentioned predetermined value ΔS1a so that the larger the index value X is, the larger the predetermined value ΔS1a is. Namely, the CPU sets the low-side remaining capacity Sd so that the larger the index value X is, the smaller the low-side remaining capacity Sd is. The index value X is the first index value that has a correlation with electric power amount charged in the storage battery 31 by the extended regeneration control performed in a period when the vehicle 10 runs the downward slope control segment (the larger the electric power amount is, the larger the first index value is).

(A1) The number X1 of the extended regeneration control expected to be performed in the downward slope control segment. Namely, the number X1 of the target deceleration ending position P0* in the downward slope control segment registered in the nonvolatile memory.

(A2) A total distance X2 of a "combined distance of the extended regeneration distance De and the target braking distance Db*" corresponding to each of the extended regeneration control expected to be performed in the downward slope control segment.

(A3) The number X3 of the extended regeneration control in which a difference between the current vehicle speed of the vehicle 10 and the target deceleration ending vehicle speed V0* registered into the nonvolatile memory exceeds a threshold Vth in the downward slope control segment. The threshold Vth is determined based on the minimum value of a "difference between vehicle speed and target deceleration ending vehicle speed" with which regenerated electric power amount becomes a predetermined amount or more in the vehicle 10.

(A4) A value X4 (=a/b) which is obtained by dividing an average value a of the number of the extended regeneration control performed in one trip after an ignition key switch of the vehicle 10 (or a power switch of a hybrid vehicle) is turned on until it is turned off by an average value b of a travel distance of the vehicle 10 in one trip.

(A5) A value X5 (=c/b) which is obtained by dividing an average value c of total distances of the "combined distance of the extended regeneration distance De and the target braking distance Db*" corresponding to each of the extended regeneration control performed in one trip by an average value b of a travel distance of the vehicle 10 in one trip.

The values X4 and X5 mean a driver's operation characteristics (tendency to repeat a brake operation).

(Specific Operation)

Figure 10:
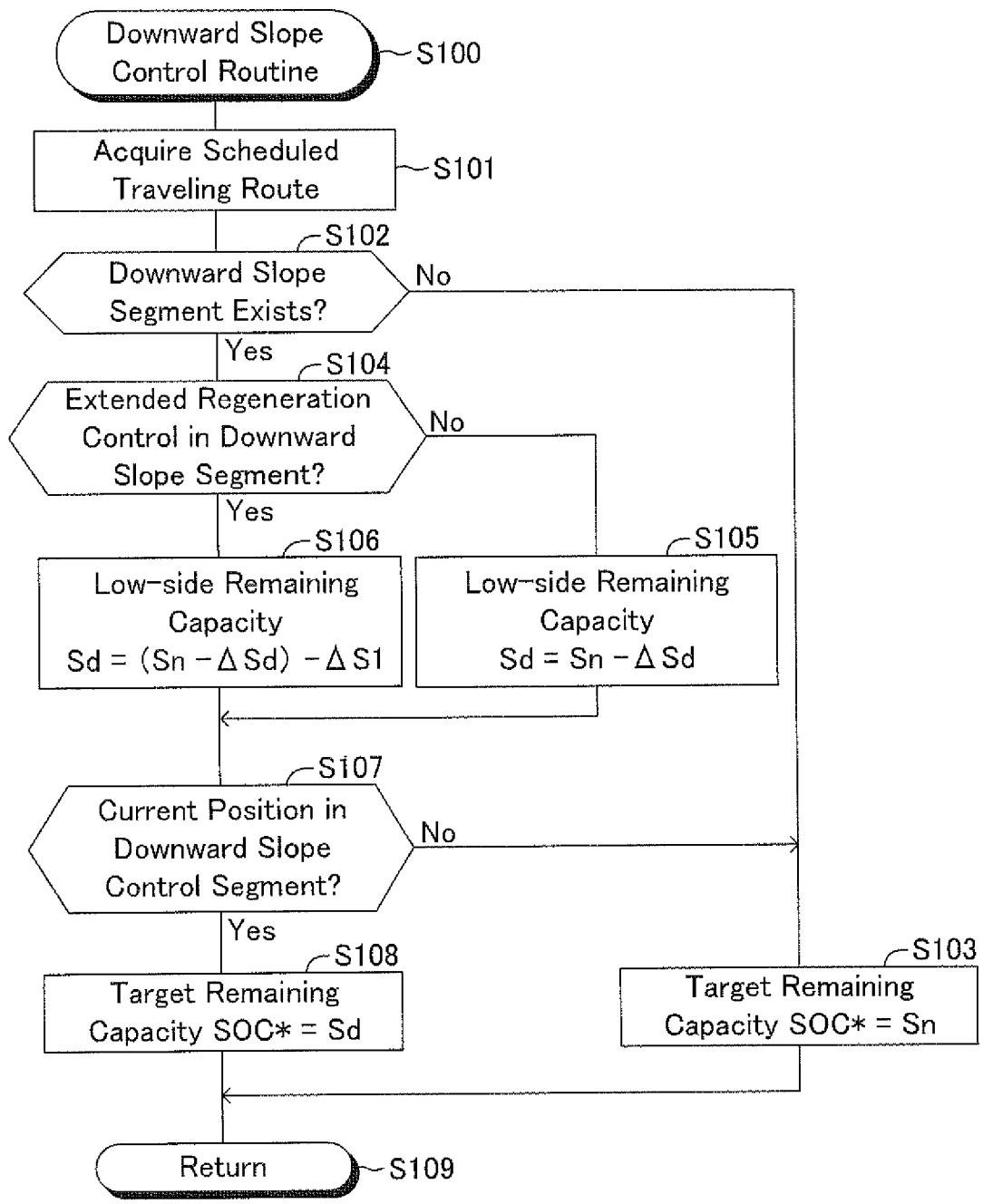
FIG. 10 is a flowchart for showing a downward slope control routine which a CPU shown in FIG. 1 performs.
Figure 14:
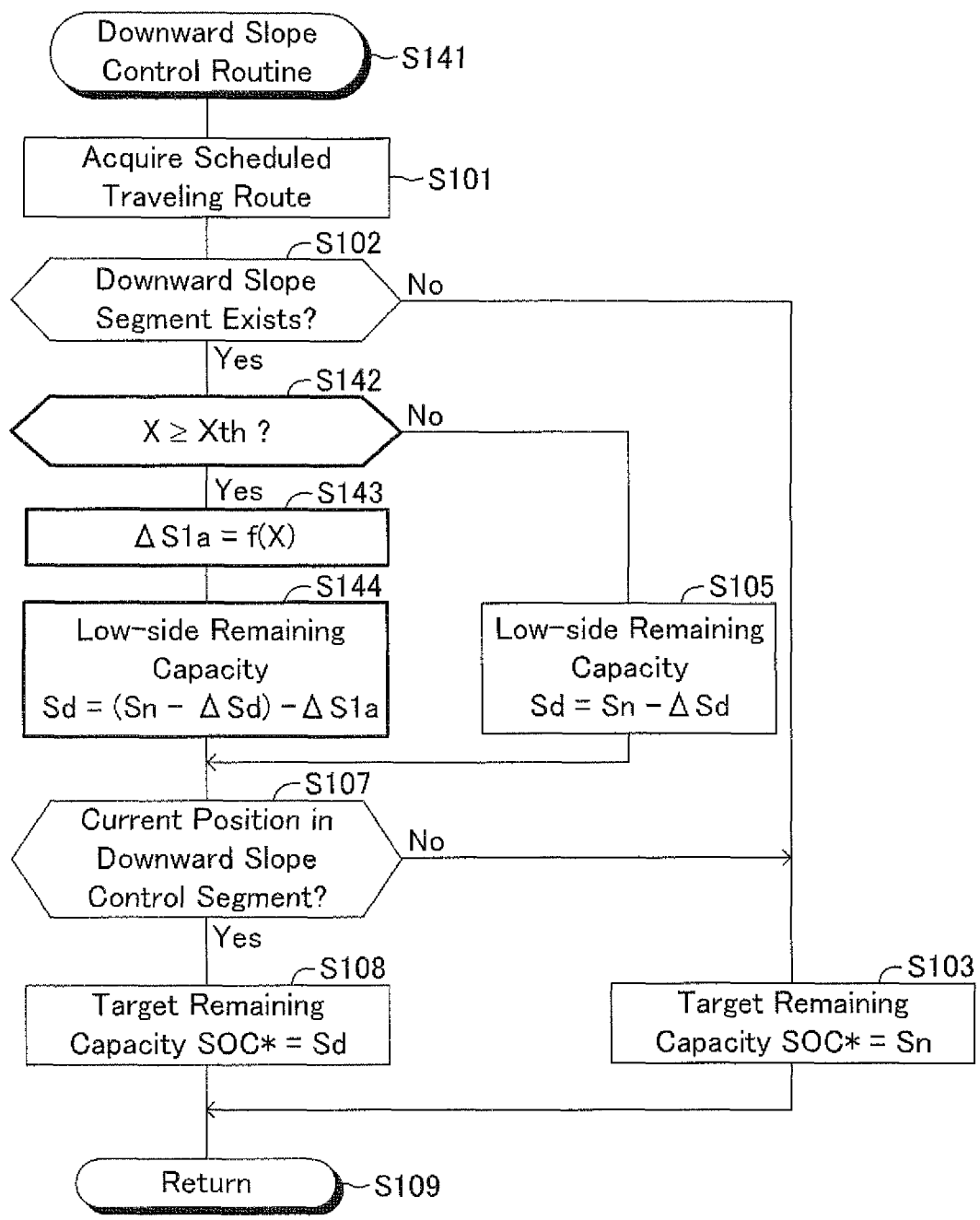
FIG. 14 is a flowchart for showing a downward slope control routine which a CPU in the present control device according to a modification performs.

The CPU in the first modification repeatedly performs a routine shown by a flowchart in FIG. 14 instead of FIG. 10 at a predetermined time interval. Among the steps shown in FIG. 14, the same reference signs as those in FIG. 10 are given to the steps for performing the processing identical to the processing performed in the steps shown in FIG. 10 and explanation thereof will be omitted.

When the CPU judges at step S102 of FIG. 14 as "Yes" and progresses to step S142, it judges whether the index value X (one of the above-mentioned index values X1 to X5) is not less than the threshold Xth. When the index value X is not less than the threshold Xth, it can be presumed that the electric power amount charged in the storage battery 31 by the extended regeneration control in the downward slope control segment is larger than the first threshold electric power amount.

When the index value X is less than the threshold Xth, the CPU judges at step S142 as "No" and progresses to step S105, and sets the low-side remaining capacity Sd to a "value which is obtained by subtracting a certain value ΔSd (for example, 5% of the maximum charge of the storage battery 31) from the standard remaining capacity Sn." In this case, it can be said that the first adjustment amount ΔS1a is "0."

On the contrary, when the index value X is not less than the threshold Xth, the CPU judges at step S142 as "Yes" and progresses to step S143, and computes the first adjustment amount ΔS1a (=f(X)) by substituting the index value X for a function f. The function f is a monotonically increasing function, and the larger the index value X is, the larger the value f(X) becomes. Therefore, the larger the index value X is, the larger the first adjustment amount ΔS1a becomes.

Next, the CPU progresses to step S144, and sets the low-side remaining capacity Sd to a "value (=(Sn−ΔSd)−ΔS1a) which is obtained by subtracting the first adjustment amount ΔS1a from a value (Sn−ΔSd) which is obtained by subtracting the certain value ΔSd from the standard remaining capacity Sn." As a result, the larger a predicted value of electric power amount charged in the storage battery 31 by the extended regeneration control which has the index value X not less than the threshold Xth and is performed in a period when the vehicle 10 is running the downward slope control segment (namely, the first predicted regenerated electric power amount) is, the larger the first adjustment amount ΔS1a becomes, and the smaller the target remaining capacity SOC* set in the downward slope control becomes.

Therefore, in accordance with the first modification, a possibility that the remaining capacity SOC may reach the remaining capacity upper limit Smax by the extended regeneration control in the period when the vehicle 10 is running the downward slope control segment can be lowered further. Therefore, a probability of occurrence of a situation where electrical energy which may be able to be collected in the storage battery 31 cannot be collected can be decreased.

<Second Modification of Embodiment>

Next, a second modification of the embodiment of the present invention will be explained. The control device for a hybrid vehicle according to the above-mentioned embodiment sets the high-side remaining capacity Sh, which is set as the target remaining capacity SOC*, to the "value the predetermined value ΔSh larger than the standard remaining capacity Sn", when it is predicted that the extended regeneration control is performed in a period when the vehicle 10 is running the pre-charge segment in front of the congested segment.

On the contrary, the second modification is different from the above-mentioned embodiment in that the "high-side remaining capacity Sh set as the target remaining capacity SOC* when it is predicted that a predicted value of electric power amount charged in the storage battery by the extended regeneration control performed in a period when the vehicle 10 is running the pre-charge segment (which will be referred to as a "second predicted regenerated electric power amount" hereafter) is larger than an electric power amount threshold" is set to a "value obtained by subtracting a predetermined value (second adjustment amount) ΔS2a from a value obtained by adding a predetermined value ΔSh to the standard remaining capacity Sn" and the predetermined value ΔS2a is adjusted according to magnitude of the second predicted regenerated electric power amount. More specifically, in the second modification, the larger the second predicted regenerated electric power amount is, the larger the above-mentioned predetermined value ΔS2a is set. In other words, in the second modification, the larger the second predicted regenerated electric power amount is, the smaller value the target remaining capacity SOC* is set to in the downward slope control in a range where it is larger than the standard remaining capacity Sn.

Furthermore, in detail, the CPU acquires one of the parameters listed below as an index value Y, and presumes that the larger the index value Y is, the larger the second predicted regenerated electric power amount is. Then, the CPU sets the above-mentioned predetermined value ΔS2a so that the larger the index value Y is, the larger the predetermined value ΔS2a is. Namely, the CPU sets the high-side remaining capacity Sh so that the larger the index value Y is, the smaller the high-side remaining capacity Sh is. The index value Y is the second index value that has a correlation with electric power amount charged in the storage battery 31 by the extended regeneration control performed in a period when the vehicle 10 runs the pre-charge segment (the larger the electric power amount is, the larger the second index value is).

(B1) The number Y1 of the extended regeneration control expected to be performed in the pre-charge segment. In other words, the number Y1 of the target deceleration ending position P0* in the pre-charge segment registered in the nonvolatile memory.

(B2) A total distance Y2 of a "combined distance of the extended regeneration distance De and the target braking distance Db*" corresponding to each of the extended regeneration control expected to be performed in the pre-charge segment.

(B3) The number Y3 of the extended regeneration control in which a difference between the current vehicle speed of the vehicle 10 and the target deceleration ending vehicle speed V0* registered into the nonvolatile memory exceeds a threshold Vth in the pre-charge segment. The threshold Vth is determined based on the minimum value of a "difference between vehicle speed and target deceleration ending vehicle speed" with which regenerated electric power amount becomes a predetermined amount or more in the vehicle 10.

(B4) A value Y4 identical with the value X4.
(B5) A value Y5 identical with the value X5.
(Specific Operation)

Figure 15:
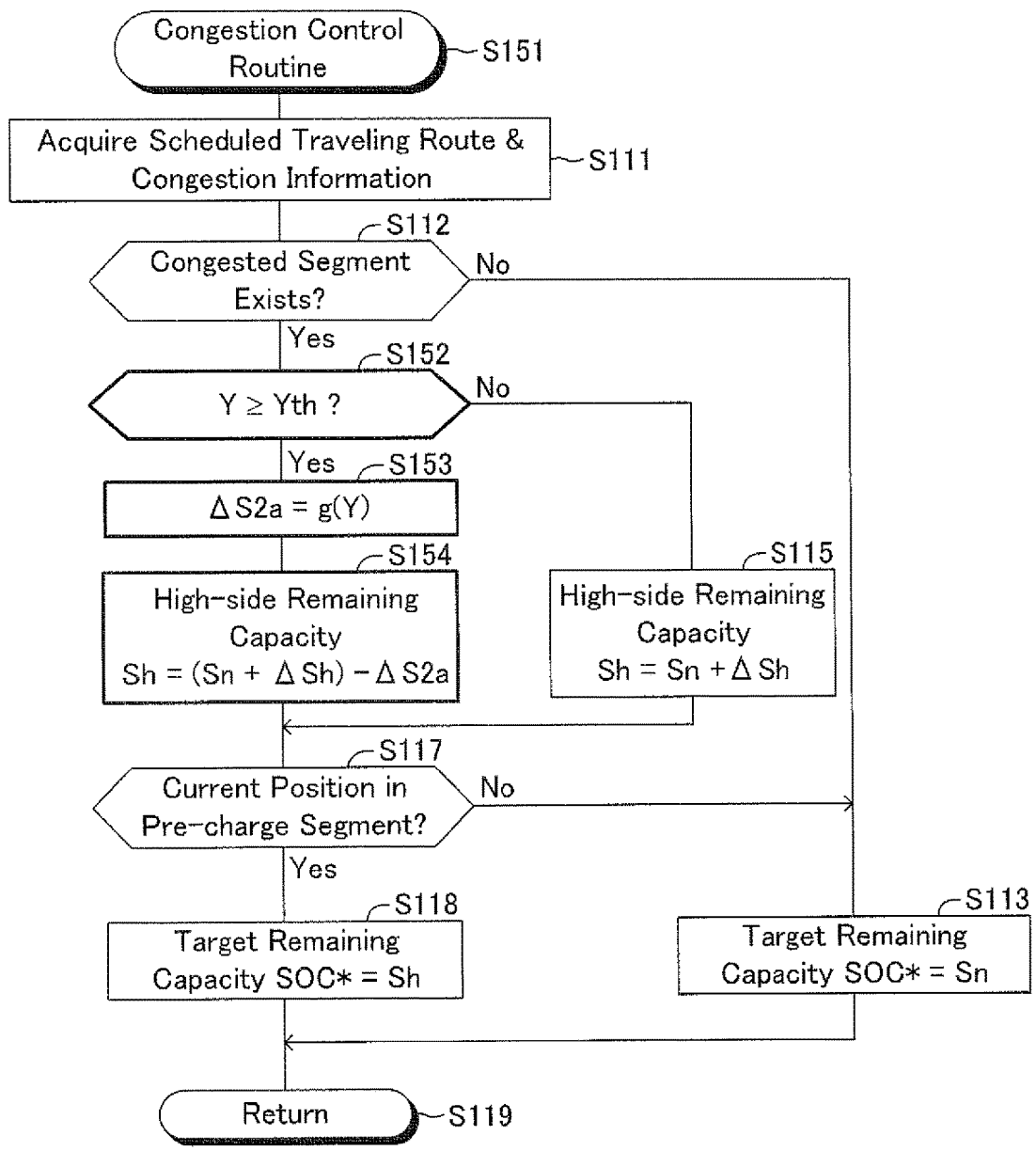
FIG. 15 is a flowchart for showing a congestion control routine which a CPU in the present control device according to a modification performs.

The CPU in the second modification repeatedly performs a routine shown by a flowchart in FIG. 15 instead of FIG. 11 at a predetermined time interval. Among the steps shown in FIG. 15, the same reference signs as those in FIG. 11 are given to the steps for performing the processing identical to the processing performed in the steps shown in FIG. 11 and explanation thereof will be omitted.

When the CPU judges at step S112 of FIG. 15 as "Yes" and progresses to step S152, it judges whether the index value Y (one of the above-mentioned index values Y1 to Y5) is not less than the threshold Yth. When the index value Y is not less than the threshold Yth, it can be presumed that the electric power amount charged in the storage battery 31 by the extended regeneration control in the pre-charge segment is larger than the second threshold electric power amount.

When the index value Y is less than the threshold Yth, the CPU judges at step S152 as "No" and progresses to step S115, and sets the high-side remaining capacity Sh to a "value which is obtained by adding a certain value ΔSh (for example, 5% of the maximum charge of the storage battery 31) to the standard remaining capacity Sn." In this case, it can be said that the second adjustment amount ΔS2a is "0."

On the contrary, when the index value Y is not less than the threshold Yth, the CPU judges at step S152 as "Yes" and progresses to step S153, and computes the second adjustment amount ΔS2a (=g(Y)) by substituting the index value Y for a function g. The function g is a monotonically increasing function, and the larger the index value Y is, the larger the value g(Y) becomes. Therefore, the larger the index value Y is, the larger the second adjustment amount ΔS2a becomes. However, when the second adjustment amount ΔS2a becomes the certain value ΔSh or more an accordance with the function g, the CPU sets the second adjustment amount ΔS2a to the certain value ΔSh.

Next, the CPU progresses to step S154, and sets the high-side remaining capacity Sh to a "value (=(Sn+ΔSh)−ΔS2a) which is obtained by subtracting the second adjustment amount ΔS2a from a value (Sn+ΔSh) which is obtained by adding the certain value ΔSh to the standard remaining capacity Sn." As a result, the larger a predicted value of electric power amount charged in the storage battery 31 by the extended regeneration control which has the index value Y not less than the threshold Yth and is performed in a period when the vehicle 10 is running the pre-charge segment (namely, the second predicted regenerated electric power amount) is, the larger the second adjustment amount ΔS2a becomes, and the smaller the target remaining capacity SOC* set in the pre-charge segment becomes in a range where it is larger than the standard remaining capacity Sn.

Therefore, in accordance with the second modification, a possibility that the remaining capacity SOC may reach the remaining capacity upper limit Smax by the extended regeneration control in the period when the vehicle 10 is running the pre-charge segment can be lowered further. Therefore, a useless operation of the engine 23 in the pre-charge segment can be omitted, and a probability of occurrence of a situation where electrical energy which may be able to be collected in the storage battery 31 cannot be collected can be decreased.

The present invention is not limited to the above-mentioned embodiments, and various modifications can be adopted within the scope of the present invention. For example, the present invention can be carried out also in accordance with a modification which is a combination of the first modification and the second modification.

Figure 16:
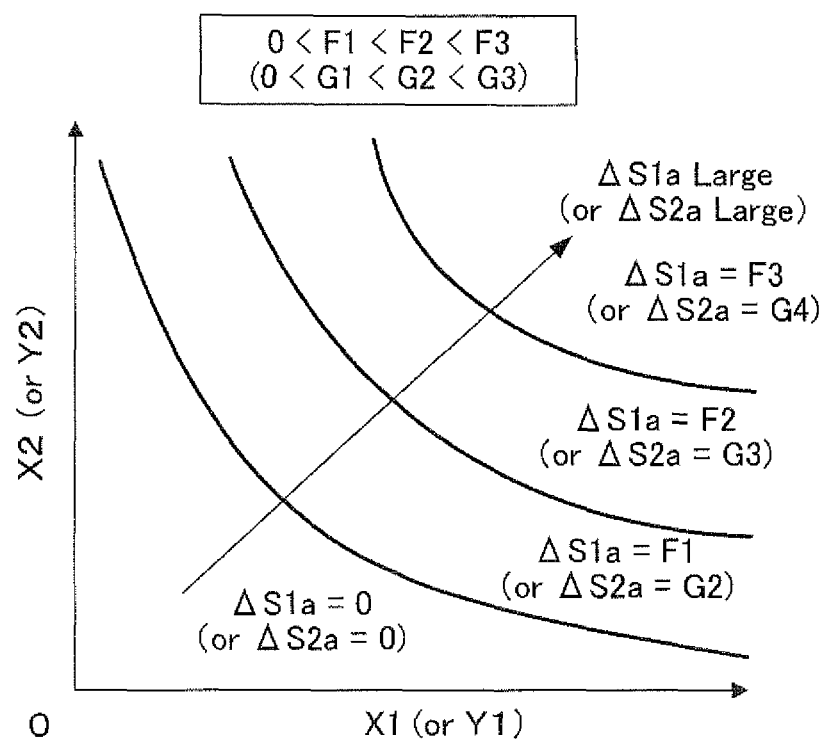
FIG. 16 is a look-up-table to which a CPU in the present control device according to another modification refers

Furthermore, in the first modification, the first adjustment amount ΔS1a may be changed based on two or more index values in the above-mentioned X1 to X5. For example, when using X1 and X2 as the index value X, the first adjustment amount ΔS1a may be determined so that the larger the index value X1 is, the larger the first adjustment amount ΔS1a becomes, and so that the larger the index value X2 is, the larger the first adjustment amount ΔS1a becomes, as shown in FIG. 16.

Similarly, in the second modification, the second adjustment amount ΔS2a may be changed based on two or more index values in the above-mentioned Y1 to Y5. For example, when using Y1 and Y2 as the index value Y, the second adjustment amount ΔS2a may be determined so that the larger the index value Y1 is, the larger the second adjustment amount ΔS2a becomes, and so that the larger the index value Y2 is, the larger the second adjustment amount ΔS2*a* becomes, as shown in FIG. 16.

REFERENCE SIGNS LIST

10: Vehicle, 21: First motor, 22: Second motor, 23: Internal combustion engine, 24: Power splitting mechanism, 31: Storage battery, 32: Boost converter, 33: First inverter, 34: Second inverter, 40: ECU.

What is claimed is:

1. A control device for a hybrid vehicle, which is applied to a hybrid vehicle comprising an internal combustion engine as a driving source of a vehicle and motors as driving sources, and a storage battery that supplies electric power to said motors, configured to be able to perform a regenerative braking using said motors and charge said storage battery with electric power generated by the regenerative braking, and configured to be able to charge said storage battery with electric power generated by using output of said internal combustion engine, and said control device for a hybrid vehicle comprises a control part configured to control said internal combustion engine and motors so that demand driving force required for said vehicle is fulfilled, and so that the remaining capacity of said storage battery approaches a target remaining capacity set to a standard remaining capacity that is said target remaining capacity at normal time, and said control part comprises:

an information-acquisition means configured to acquire information about a scheduled traveling route of said vehicle and a location of said vehicle, an assistance control means configured to perform, as a look-ahead assistance control, at least one control of the following;

a downward slope control in which said target remaining capacity is changed to a low-side remaining capacity smaller than said standard remaining capacity when said vehicle is running a segment including at least a pre-use segment within a first segment when it is judged that a scheduled traveling route of said vehicle contains a downward slope segment that fulfills a predetermined downward slope segment condition based on information about said scheduled traveling route, and said pre-use segment is a segment from a starting point of said downward slope control to a starting point of said downward slope segment, said first segment is a segment from said starting point of said downward slope control to an ending point of said downward slope segment, and said starting point of said downward slope control is a point a predetermined first distance in front of said starting point of said downward slope segment, and a congestion control in which said target remaining capacity is changed to a high-side remaining capacity larger than said standard remaining capacity when said vehicle is running a second segment when it is judged that said scheduled traveling route of said vehicle contains a congested segment that fulfills a predetermined congested segment condition based on information about said scheduled traveling route, and said second segment is a segment from a starting point of said congestion control to a starting point of said congested segment, and said starting point of said congestion control is a point a predetermined second distance in front of said starting point of said congested segment, and an extended regeneration control means configured to perform an extended regeneration control, and said extended regeneration control is control in which a location where a slowdown of said vehicle is predicted to end based on an everyday driving operation by a driver of said vehicle is set as a target slowdown ending location, a deceleration starting location is set and said regenerative braking is strengthened from said deceleration starting location so that an electric power amount charged in said storage battery by said regenerative braking from said deceleration starting location to said target slowdown ending location becomes larger as compared with an electric power amount charged in said storage battery by said everyday driving operation by said driver when said vehicle is predicted to slow down based on information about a location of said vehicle, wherein:

said control part comprises a target remaining capacity correction means configured to;

correct said target remaining capacity to a value that is a first adjustment amount smaller than said low-side remaining capacity in a first case that is a case where an electric power amount charged in said storage battery by said extended regeneration control when said vehicle runs said first segment including said segment, in which said downward slope control is performed, is larger than a first threshold electric power amount, and correct said target remaining capacity to a value that is a second adjustment amount smaller than said high-side remaining capacity in a second case that is a case where an electric power amount charged in said storage battery by said extended regeneration control when said vehicle runs said second segment, in which said congestion control is performed, is larger than a second threshold electric power amount.

2. The control device for a hybrid vehicle according to claim 1, wherein:

said target remaining capacity correction means is configured so that:

said first adjustment amount increases as a first index value, that is an index value having a correlation with an electric power amount charged in said storage battery by execution of said extended regeneration control in a period when said vehicle is running said first segment in said first case, increases, and said second adjustment amount increases as a second index value, that is an index value having a correlation with an electric power amount charged in said storage battery by execution of said extended regeneration control in a period when said vehicle is running said second segment in said second case, increases.

3. A control device for a hybrid vehicle, which is applied to a hybrid vehicle comprising an internal combustion engine as a driving source of a vehicle and motors as driving sources, and a storage battery that supplies electric power to said motors, configured to be able to perform a regenerative braking using said motors and charge said storage battery with electric power generated by the regenerative braking, and configured to be able to charge said storage battery with electric power generated by using output of said internal combustion engine, and said control device for a hybrid vehicle comprises an electric control circuit (ECU) configured to:

control said internal combustion engine and motors so that demand driving force required for said vehicle is fulfilled, and so that the remaining capacity of said storage battery approaches a target remaining capacity set to a standard remaining capacity that is said target remaining capacity at normal time, acquire information about a scheduled traveling route of said vehicle and a location of said vehicle, perform, as a look-ahead assistance control, at least one control of the following:

a downward slope control in which said target remaining capacity is changed to a low-side remaining capacity smaller than said standard remaining capacity when said vehicle is running a segment including at least a pre-use segment within a first segment when it is judged that a scheduled traveling route of said vehicle contains a downward slope segment that fulfills a predetermined downward slope segment condition based on information about said scheduled traveling route, and said pre-use segment is a segment from a starting point of said downward slope control to a starting point of said downward slope segment, said first segment is a segment from said starting point of said downward slope control to an ending point of said downward slope segment, and said starting point of said downward slope control is a point a predetermined first distance in front of said starting point of said downward slope segment, and a congestion control in which said target remaining capacity is changed to a high-side remaining capacity larger than said standard remaining capacity when said vehicle is running a second segment when it is judged that said scheduled traveling route of said vehicle contains a congested segment that fulfills a predetermined congested segment condition based on information about said scheduled traveling route, and said second segment is a segment from a starting point of said congestion control to a starting point of said congested segment, and said starting point of said congestion control is a point a predetermined second distance in front of said starting point of said congested segment, and perform an extended regeneration control, and said extended regeneration control is control in which a location where a slowdown of said vehicle is predicted to end based on an everyday driving operation by a driver of said vehicle is set as a target slowdown ending location, a deceleration starting location is set and said regenerative braking is strengthened from said deceleration starting location so that an electric power amount charged in said storage battery by said regenerative braking from said deceleration starting location to said target slowdown ending location becomes larger as compared with an electric power amount charged in said storage battery by said everyday driving operation by said driver when said vehicle is predicted to slow down based on information about a location of said vehicle, wherein:

said electric control circuit is further configured to; correct said target remaining capacity to a value that is a first adjustment amount smaller than said low-side remaining capacity in a first case that is a case where an electric power amount charged in said storage battery by said extended regeneration control when said vehicle runs said first segment including said segment, in which said downward slope control is performed, is larger than a first threshold electric power amount, and correct said target remaining capacity to a value that is a second adjustment amount smaller than said high-side remaining capacity in a second case that is a case where an electric power amount charged in said storage battery by said extended regeneration control when said vehicle runs said second segment, in which said congestion control is performed, is larger than a second threshold electric power amount.

4. The control device for a hybrid vehicle according to claim 3, wherein:

said electric control unit is further configured so that:

said first adjustment amount increases as a first index value, that is an index value having a correlation with an electric power amount charged in said storage battery by execution of said extended regeneration control in a period when said vehicle is running said first segment in said first case, increases, and said second adjustment amount increases as a second index value, that is an index value having a correlation with an electric power amount charged in said storage battery by execution of said extended regeneration control in a period when said vehicle is running said second segment in said second case, increases.

* * * * *